(12) United States Patent
Mizoguchi

(10) Patent No.: US 11,969,885 B2
(45) Date of Patent: Apr. 30, 2024

(54) ROBOTIC SYSTEM WITH GRIPPING MECHANISM

(71) Applicant: Mujin, Inc., Tokyo (JP)

(72) Inventor: Hironori Mizoguchi, Tokyo (JP)

(73) Assignee: MUJIN, INC., Tokyo (JP)

( * ) Notice: Subject to any disclaimer, the term of this patent is extended or adjusted under 35 U.S.C. 154(b) by 32 days.

(21) Appl. No.: 16/945,370

(22) Filed: Jul. 31, 2020

(65) Prior Publication Data

US 2021/0260775 A1 Aug. 26, 2021

Related U.S. Application Data

(60) Provisional application No. 62/979,413, filed on Feb. 20, 2020.

(51) Int. Cl.
| | |
|---|---|
| B25J 15/06 | (2006.01) |
| B25J 9/10 | (2006.01) |
| B25J 13/08 | (2006.01) |
| B65G 61/00 | (2006.01) |

(52) U.S. Cl.
CPC ........... B25J 15/0616 (2013.01); B25J 9/101 (2013.01); B25J 13/085 (2013.01); B25J 15/0683 (2013.01); B65G 61/00 (2013.01)

(58) Field of Classification Search
CPC ............... B25J 15/0616; B25J 15/0683; B25J 15/0658; B25J 9/101; B25J 13/081; B25J 13/085
See application file for complete search history.

(56) References Cited

U.S. PATENT DOCUMENTS

| | | | |
|---|---|---|---|
| 10,350,755 B2 | 7/2019 | Wagner et al. | |
| 2018/0200892 A1* | 7/2018 | Shimada | B25J 9/1651 |
| 2020/0262069 A1* | 8/2020 | Douglas | B25J 15/0691 |

FOREIGN PATENT DOCUMENTS

| | | | |
|---|---|---|---|
| JP | 04087788 A | * | 3/1992 |
| JP | H04-087788 A | | 3/1992 |
| JP | 06255772 A | * | 9/1994 |
| JP | H06-255772 A | | 9/1994 |

(Continued)

OTHER PUBLICATIONS

Notice of Reasons for Rejection in related Japanese Patent Application No. 2020-134325, dated Oct. 21, 2020; English translation provided (9 pages).

(Continued)

*Primary Examiner* — Gerald McClain
(74) *Attorney, Agent, or Firm* — Procopio, Cory, Hargreaves & Savitch LLP

(57) ABSTRACT

A robotic system includes an end-effector configured for grasping an object, the end-effector including a suction cup assembly configured to engage the object, and a contact limit sensor configured to detect a pressure associated with the engagement between the suction cup assembly and the object, wherein the contact limit sensor transmits contact information when the contact limit sensor detects the pressure exceeding a contact threshold, a sensor unit monitoring contact information received from the contact limit sensor, and a controller, coupled to the sensor unit, configured to execute an operation for controlling the end-effector to limit movement of the end-effector toward the object based on the contact information received.

17 Claims, 16 Drawing Sheets

(56) References Cited

FOREIGN PATENT DOCUMENTS

| | | |
|---|---|---|
| JP | H07-136965 A | 5/1995 |
| JP | 2010-188483 A | 9/2010 |
| JP | 2010188483 A * | 9/2010 |

OTHER PUBLICATIONS

Final Notice of Reasons for Rejection in related Japanese Patent Application No. 2020-134325, dated Nov. 30, 2020; English translation provided (9 pages).
Decision to Grant in related Japanese Patent Application No. 2020-134325, dated Dec. 23, 2020 (3 pages).

* cited by examiner

ROBOTIC SYSTEM WITH GRIPPING MECHANISM

CROSS-REFERENCE TO RELATED APPLICATIONS

This application claims benefit of priority from Provisional U.S. Patent application Ser. No. 62/979,413, filed Feb. 20, 2020, the contents of which are incorporated by reference.

TECHNICAL FIELD

The present relates generally to robotic systems and, more specifically, to systems with a gripping mechanism.

BACKGROUND

With their ever-increasing performance and lowering cost, many robots (e.g., machines configured to automatically/autonomously execute physical actions) are now extensively used in many fields. Robots, for example, can be used to execute various tasks (e.g., manipulate or transfer an object through space) in manufacturing and/or assembly, packing and/or packaging, transport and/or shipping, etc. In executing the tasks, the robots can replicate human actions, thereby replacing or reducing human involvements that are otherwise required to perform dangerous or repetitive tasks.

However, despite the technological advancements, robots often lack the sophistication necessary to duplicate human interactions required for executing larger and/or more complex tasks. For example, related art systems fail to have the capability to detect whether the force applied by a gripper or manipulator is approaching or exceeding thresholds associated with safely gripping and/or picking up an object without damage to the object. In such a situation, a robot may damage the delicate items without recognizing that the gripper force has exceeded the safety thresholds. Accordingly, there remains a need for improved techniques and systems for managing operations and/or interactions between robots and objects being manipulated.

SUMMARY

Aspects of the present invention may include a robotic system. The robotic system may include an end-effector configured for grasping an object, a sensor unit monitoring contact information received from a contact limit sensor; and a controller, coupled to the sensor unit. The end-effector may including a suction cup assembly configured to engage the object, and a contact limit sensor configured to detect a pressure associated with the engagement between the suction cup assembly and the object, wherein the contact limit sensor transmits contact information when the contact limit sensor detects the pressure exceeding a contact threshold. The controller may be configured to execute an operation for controlling the end-effector to limit movement of the end-effector toward the object based on the contact information received to prevent damage to the object.

Additional aspects of the present invention may include an object handling unit including a robotic arm, and an end-effector configured for grasping an object. The end-effector may include a suction cup assembly configured to engage the object, and a contact limit sensor configured to detect a pressure associated with the engagement between the suction cup assembly and the object, wherein the contact limit sensor transmits contact information when the contact limit sensor detects the pressure exceeding a contact threshold, and wherein the transmitted contact information causes movement of the end-effector toward the object to be limited to prevent damage to the object.

Further aspects of the present invention may include a gripper attachment for an object handling system including an end-effector configured for grasping an object. The end effector may include a suction cup assembly configured to engage the object and a contact limit sensor. The suction cup assembly may include a housing, a first suction cup configured to couple to a vacuum pressure source, wherein the first suction cup is displaceable relative to the housing, and a second suction cup coupled to a vacuum pressure source, wherein the second suction cup is displaceable relative to the housing and independent of the first suction cup. The contact limit sensor configured to detect a pressure associated with the engagement between the suction cup assembly and the object based on displacement of the first suction cup and the second section cup relative to the housing, wherein the contact limit sensor transmits contact information when the contact limit sensor detects the pressure exceeding a contact threshold and wherein the transmitted contact information causes movement of the end-effector toward the object to be limited to prevent damage to the object.

Certain embodiments of the invention have other steps or elements in addition to or in place of those mentioned above. The steps or elements will become apparent to those skilled in the art from a reading of the following detailed description when taken with reference to the accompanying drawings.

BRIEF DESCRIPTION OF THE DRAWINGS

Exemplary embodiment(s) of the present invention will be described in detail based on the following figures, wherein.

DETAILED DESCRIPTION

Figure 1:
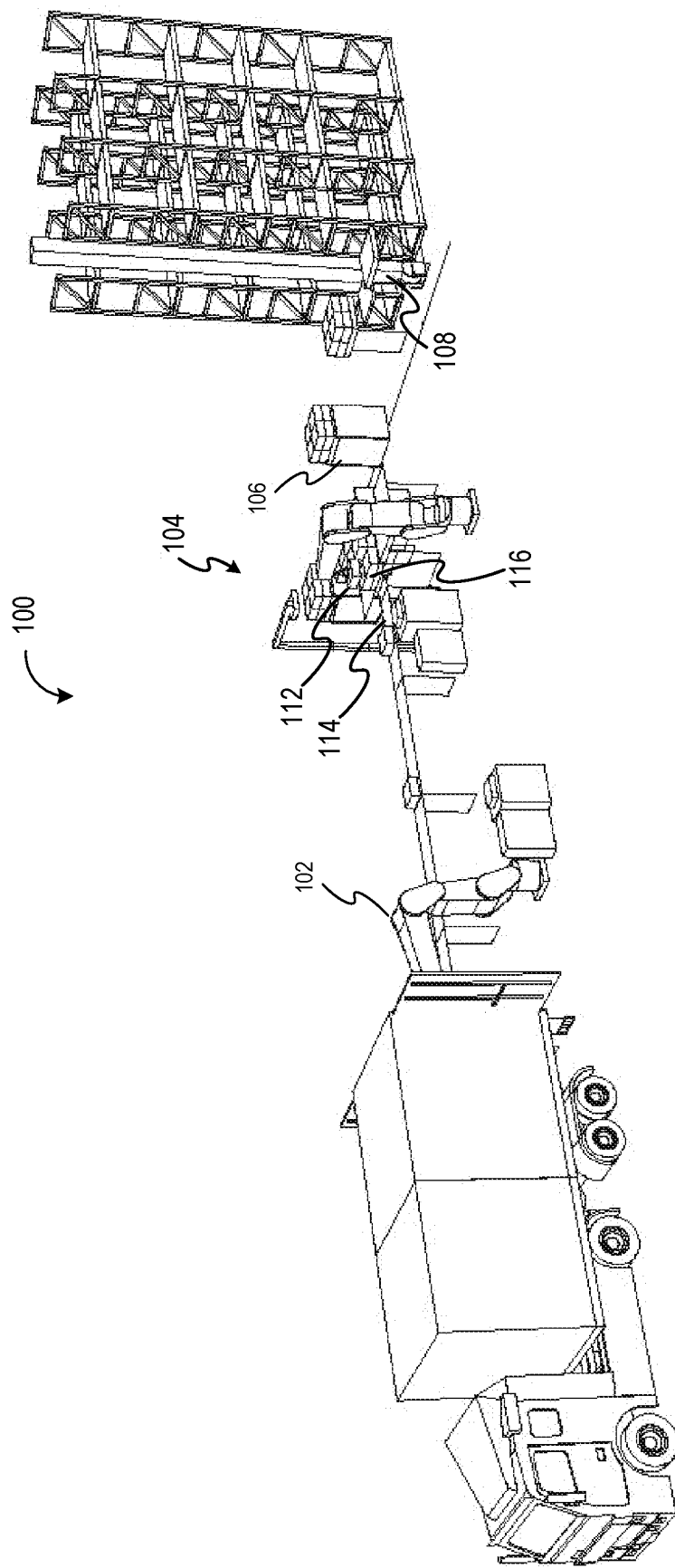
FIG. 1 is an illustration of an example environment in which a robotic system in accordance with example embodiments of the present invention.

In the following description, numerous specific details are set forth to provide a thorough understanding of the presently disclosed technology. In other embodiments, the techniques introduced here can be practiced without these specific details. In other instances, well-known features, such as specific functions or routines, are not described in detail in order to avoid unnecessarily obscuring the present disclosure. References in this description to "an embodiment," "one embodiment," or the like mean that a particular feature, structure, material, or characteristic being described is included in at least one embodiment of the present disclosure. Thus, the appearances of such phrases in this specification do not necessarily all refer to the same embodiment. On the other hand, such references are not necessarily mutually exclusive either. Furthermore, the particular features, structures, materials, or characteristics can be combined in any suitable manner in one or more embodiments.

It is to be understood that the various embodiments shown in the figures are merely illustrative representations. Further, the drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

Several details describing structures or processes that are well-known and often associated with robotic systems and subsystems, but that can unnecessarily obscure some significant aspects of the disclosed techniques, are not set forth in the following description for purposes of clarity. Moreover, although the following disclosure sets forth several embodiments of different aspects of the present technology, several other embodiments can have different configurations or different components than those described in this section. Accordingly, the disclosed techniques can have other embodiments with additional elements or without several of the elements described below.

Many embodiments or aspects of the present disclosure described below can take the form of computer-executable or controller-executable instructions, including routines executed by a programmable computer or controller. Those skilled in the relevant art will appreciate that the disclosed techniques can be practiced on computer or controller systems other than those shown and described below. The techniques described herein can be embodied in a special-purpose computer or data processor that is specifically programmed, configured, or constructed to execute one or more of the computer-executable instructions described below. Accordingly, the terms "computer" and "controller" as generally used herein refer to any data processor and can include Internet appliances and handheld devices, including palm-top computers, wearable computers, cellular or mobile phones, multi-processor systems, processor-based or programmable consumer electronics, network computers, mini computers, and the like. Information handled by these computers and controllers can be presented at any suitable display medium, including a liquid crystal display (LCD). Instructions for executing computer- or controller-executable tasks can be stored in or on any suitable computer-readable medium, including hardware, firmware, or a combination of hardware and firmware. Instructions can be contained in any suitable memory device, including, for example, a flash drive, USB device, and/or other suitable medium.

The terms "coupled" and "connected," along with their derivatives, can be used herein to describe structural relationships between components. It should be understood that these terms are not intended as synonyms for each other. Rather, in particular embodiments, "connected" can be used to indicate that two or more elements are in direct contact with each other. Unless otherwise made apparent in the context, the term "coupled" can be used to indicate that two or more elements are in either direct or indirect (with other intervening elements between them) contact with each other, or that the two or more elements co-operate or interact with each other (e.g., as in a cause-and-effect relationship, such as for signal transmission/reception or for function calls), or both.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

Referring now to FIG. 1, therein is shown an example environment in which a robotic system 100 with an object handling mechanism can operate. The operating environment for the robotic system 100 can include one or more structures, such as robots or robotic devices, configured to execute one or more tasks. Aspects of the object handling mechanisms illustrated herein can be practiced or implemented by the various structures.

In the example illustrated in FIG. 1, the robotic system 100 can include an unloading unit 102, a transfer unit 104, a transport unit 106, a loading unit 108, or a combination thereof in a warehouse, a distribution center, or a shipping hub. Each of the units in the robotic system 100 can be configured to execute one or more tasks. The tasks can be combined in sequence to perform an operation that achieves a goal, for example, such as to unload objects from a vehicle, such as a truck, trailer, a van, or train car, for storage in a warehouse or to unload objects from storage locations and load them onto a vehicle for shipping. In another example, the task can include moving objects from one location, such as a container, bin, cage, basket, shelf, platform, pallet, or conveyor belt, to another location. Each of the units can be configured to execute a sequence of actions, such as operating one or more components therein, to execute a task.

In some embodiments, the task can include interaction with a target object 112, such as manipulation, moving, reorienting or a combination thereof, of the object. The target object 112 is the object that will be handled by the robotic system 100. More specifically, the target object 112 can be the specific object among many objects that is the target of an operation or task by the robotics system 100. For example, the target object 112 can be the object that the robotic system 100 has selected for or is currently being handled, manipulated, moved, reoriented, or a combination thereof. The target object 112, as examples, can include boxes, cases, tubes, packages, bundles, an assortment of individual items, or any other object that can be handled by the robotic system 100.

As an example, the task can include transferring the target object 112 from an object source 114 to a task location 116. The object source 114 is a receptacle for storage of objects. The object source 114 can include numerous configurations and forms. For example, the object source 114 can be a platform, with or without walls, on which objects can be placed or stacked, such as a pallet, a shelf, or a conveyor belt. As another example, the object source 114 can be a partially or fully enclosed receptacles with walls or lids in which objects can be placed, such as a bin, cage, or basket. In some embodiments, the walls of the object source 114, which can be partially or fully enclosed, can be transparent or can include openings or gaps of various sizes such that portions of the objects contained therein can be visible or partially visible through the walls.

FIG. 1 illustrates examples of the possible functions and operations that can be performed by the various units of the robotic system 100 in handling the target object 112 and it is understood that the environment and conditions can differ from those described hereinafter. For example, the unloading unit 102 can be a vehicle offloading robot configured to transfer the target object 112 from a location in a carrier, such as a truck, to a location on a conveyor belt. Also, the transfer unit 104, such as a palletizing robot, can be configured to transfer the target object 112 from a location on the conveyor belt to a location on the transport unit 106, such as for loading the target object 112 on a pallet on the transport unit 106. In another example, the transfer unit 104 can be a piece-picking robot configured to transfer the target object 112 from one container to another container. In completing the operation, the transport unit 106 can transfer the target object 112 from an area associated with the transfer unit 104 to an area associated with the loading unit 108, and the loading unit 108 can transfer the target object 112, such as by moving the pallet carrying the target object 112, from the transfer unit 104 to a storage location, such as a location on the shelves. Details regarding the task and the associated actions are described below.

For illustrative purposes, the robotic system 100 is described in the context of a shipping center; however, it is understood that the robotic system 100 can be configured to execute tasks in other environments or for other purposes, such as for manufacturing, assembly, packaging, healthcare, or other types of automation. It is also understood that the robotic system 100 can include other units, such as manipulators, service robots, or modular robots that are not shown in FIG. 1. For example, in some embodiments, the robotic system 100 can include a depalletizing unit for transferring the objects from cages, carts, or pallets onto conveyors or other pallets, a container-switching unit for transferring the objects from one container to another, a packaging unit for wrapping the objects, a sorting unit for grouping objects according to one or more characteristics thereof, a piece-picking unit for manipulating the objects differently, such as sorting, grouping, and/or transferring, according to one or more characteristics thereof, or a combination thereof.

Figure 2:
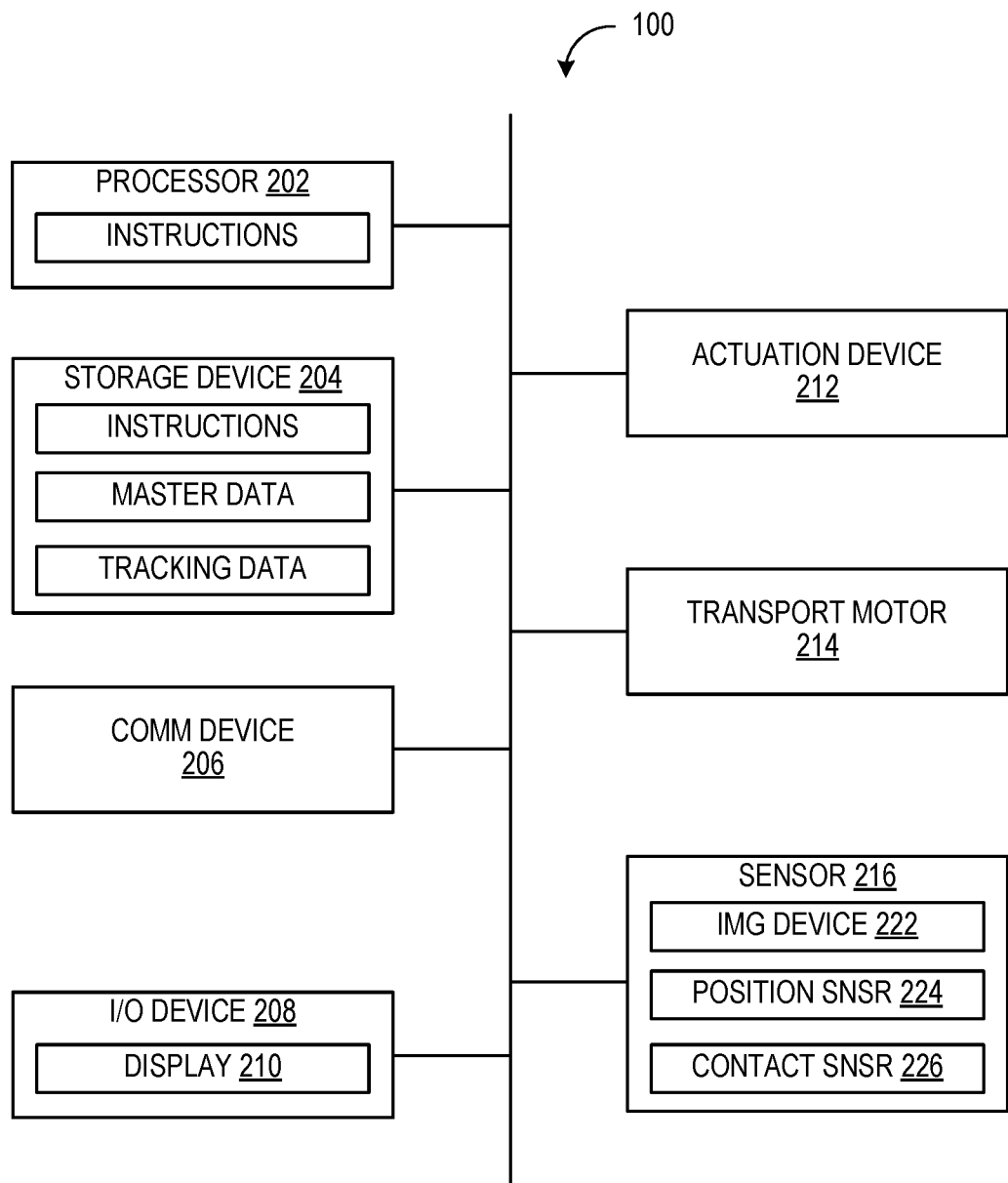
FIG. 2 is a block diagram illustrating the robotic system in accordance with example embodiments of the present invention.

Referring now to FIG. 2, therein is shown a block diagram illustrating the robotic system 100 in accordance with one or more embodiments of the present invention. In some embodiments, for example, the robotic system 100 can include electronic devices, electrical devices, or a combination thereof, such as a control unit 202, a storage unit 204, a communication unit 206, a system interface 208, one or more actuation devices 212, one or more transport motors 214, one or more sensor units 216, or a combination thereof that are coupled to one another, integrated with or coupled to one or more of the units or robots described in FIG. 1 above, or a combination thereof.

The control unit 202 can be implemented in a number of different ways. For example, the control unit 202 can be a processor, an application specific integrated circuit (ASIC), an embedded processor, a microprocessor, a hardware control logic, a hardware finite state machine (FSM), a digital signal processor (DSP), or a combination thereof. The control unit 202 can execute software 210 to provide the intelligence of the robotic system 100.

The control unit 202 can include a control interface 240. The control interface 240 can be used for communication between the control unit 202 and other functional units in the robotic system 100. The control interface 240 can also be used for communication that is external to the robotic system 100. The control interface 240 can receive information from the other functional units or from external sources, or can transmit information to the other functional units or to external destinations. The external sources and the external destinations refer to sources and destinations external to the robotic system 100.

The control interface 240 can be implemented in different ways and can include different implementations depending on which functional units or external units are being interfaced with the control interface 240. For example, the control interface 240 can be implemented with a pressure sensor, an inertial sensor, a microelectromechanical system (MEMS), optical circuitry, waveguides, wireless circuitry, wireline circuitry, application programming interface, or a combination thereof.

The storage unit 204 can store the software 210, master data 246, or a combination thereof. For illustrative purposes, the storage unit 204 is shown as a single element, although it is understood that the storage unit 204 can be a distribution of storage elements. Also for illustrative purposes, the robotic system 100 is shown with the storage unit 204 as a single hierarchy storage system, although it is understood that the robotic system 100 can have the storage unit 204 in a different configuration. For example, the storage unit 204 can be formed with different storage technologies forming a memory hierarchal system including different levels of caching, main memory, rotating media, or off-line storage.

The storage unit 204 can be a volatile memory, a non-volatile memory, an internal memory, an external memory, or a combination thereof. For example, the storage unit 204 can be a nonvolatile storage such as non-volatile random access memory (NVRAM), Flash memory, disk storage, or a volatile storage such as static random access memory (SRAM). As a further example, storage unit 204 can be a non-transitory computer medium including the non-volatile memory, such as a hard disk drive, NVRAM, solid-state storage device (SSD), compact disk (CD), digital video disk (DVD), or universal serial bus (USB) flash memory devices. The software 210 can be stored on the non-transitory computer readable medium to be executed by a control unit 202.

The storage unit 204 can include a control interface 240. The control interface 240 can be used for communication between the storage unit 204 and other functional units in the robotic system 100. The control interface 240 can also be used for communication that is external to the robotic system 100. The control interface 240 can receive information from the other functional units or from external sources, or can transmit information to the other functional units or to external destinations. The external sources and the external destinations refer to sources and destinations external to the robotic system 100.

The control interface 240 can include different implementations depending on which functional units or external units are being interfaced with the storage unit 204. The control interface 240 can be implemented with technologies and techniques similar to the implementation of the control interface 240.

In one embodiment, the storage unit 204 can be used to further store and provide access to processing results, predetermined data, thresholds, or a combination thereof. For example, the storage unit 204 can store the master data 246 that includes descriptions of the one or more target objects 104, for example, boxes, box types, cases, case types, products, or a combination thereof. In one embodiment, the master data 246 can include a dimension, a shape, for example, templates for potential poses or computer-generated models for recognizing the one or more target objects 104 in different poses, a color scheme, an image, identification information, for example, bar codes, quick response (QR) codes, logos, expected locations, an expected weight, or a combination thereof, for the one or more target objects 104 expected to be manipulated by the robotic system 100.

In one embodiment, the master data 246 can further include manipulation-related information regarding the one or more objects that can be encountered or handled by the robotic system 100. For example, the manipulation-related information for the objects can include a center-of-mass location on each of the objects, expected sensor measurements, for example, for force, torque, pressure, or contact measurements, corresponding to one or more actions, maneuvers, or a combination thereof.

The communication unit 206 can enable external communication to and from the robotic system 100. For example, the communication unit 206 can enable the robotic system 100 to communicate with other robotic systems or units, external devices, such as an external computer, an external database, an external machine, an external peripheral device, or a combination thereof, through a communication path 218, such as a wired or wireless network.

The communication path 218 can span and represent a variety of networks and network topologies. For example, the communication path 218 can include wireless communication, wired communication, optical communication, ultrasonic communication, or the combination thereof. For example, satellite communication, cellular communication, Bluetooth, Infrared Data Association standard (lrDA), wireless fidelity (WiFi), and worldwide interoperability for microwave access (WiMAX) are examples of wireless communication that can be included in the communication path 218. Cable, Ethernet, digital subscriber line (DSL), fiber optic lines, fiber to the home (FTTH), and plain old telephone service (POTS) are examples of wired communication that can be included in the communication path 218. Further, the communication path 218 can traverse a number of network topologies and distances. For example, the communication path 218 can include direct connection, personal area network (PAN), local area network (LAN), metropolitan area network (MAN), wide area network (WAN), or a combination thereof. The robotic system 100 can transmit information between the various units through the communication path 218. For example, the information can be transmitted between the control unit 202, the storage unit 204, the communication unit 206, the system interface 208, the actuation devices 212, the transport motors 214, the sensor units 216, or a combination thereof.

The communication unit 206 can also function as a communication hub allowing the robotic system 100 to function as part of the communication path 218 and not limited to be an end point or terminal unit to the communication path 218. The communication unit 206 can include active and passive components, such as microelectronics or an antenna, for interaction with the communication path 218.

The communication unit 206 can include a communication interface 248. The communication interface 248 can be used for communication between the communication unit 206 and other functional units in the robotic system 100. The communication interface 248 can receive information from the other functional units or from external sources, or can transmit information to the other functional units or to external destinations. The external sources and the external destinations refer to sources and destinations external to the robotic system 100.

The communication interface 248 can include different implementations depending on which functional units are being interfaced with the communication unit 206. The communication interface 248 can be implemented with technologies and techniques similar to the implementation of the control interface 240.

The I/O device 208 can include an input device and an output device. Examples of the input device of the I/O device 208 can include a keypad, a touchpad, soft-keys, a keyboard, a microphone, sensors for receiving remote signals, a camera for receiving motion commands, or any combination thereof to provide data and communication inputs. Examples of the output device can include a display interface 210. The display interface 210 can be any graphical user interface such as a display, a projector, a video screen, or any combination thereof.

The control unit 202 can operate the I/O device 208 to present or receive information generated by the robotic system 100. The control unit 202 can operate the user interface 216 to present information generated by the robotic system 100. The control unit 202 can also execute the software 210 for the other functions of the robotic system 100. The control unit 202 can further execute the software 210 for interaction with the communication path 218 via the communication unit 206.

The robotic system 100 can include physical or structural members, such as robotic manipulator arms, that are connected at joints for motion, such as rotational displacement, translational displacement, or a combination thereof. The structural members and the joints can form a kinetic chain configured to manipulate an end-effector, such as a gripper, to execute one or more tasks, such as gripping, spinning, or welding, depending on the use or operation of the robotic system 100. The robotic system 100 can include the actuation devices 212, such as motors, actuators, wires, artificial muscles, electroactive polymers, or a combination thereof, configured to drive, manipulate, displace, reorient, or a combination thereof, the structural members about or at a corresponding joint. In some embodiments, the robotic system 100 can include the transport motors 214 configured to transport the corresponding units from place to place.

The robotic system 100 can include the sensor units 216 configured to obtain information used to execute tasks and operations, such as for manipulating the structural members or for transporting the robotic units. The sensor units 216 can include devices configured to detect or measure one or more physical properties of the robotic system 100, such as a state, a condition, a location of one or more structural members or joints, information about objects or surrounding environment, or a combination thereof. As an example, the sensor units 216 can include imaging devices 222, system sensors 224, contact sensors 226, or a combination thereof.

In some embodiments, the sensor units 216 can include one or more imaging devices 222. The imaging devices 222 are devices configured to detect the surrounding environment. For example, the imaging devices 222 can include 2-dimensional cameras, 3-dimensional cameras, both of which can include a combination of visual and infrared capabilities, LIDARS, RADARS, other distance-measuring devices, and other imaging devices. The imaging devices 222 can generate a representation of the detected environment, such as a digital image or a point cloud, used for implementing machine/computer vision for automatic inspection, robot guidance, or other robotic applications. As described in further detail below, the robotic system 100 can process the digital image, the point cloud, or a combination thereof via the control unit 202 to identify the target object 112 of FIG. 1, a pose of the target object 112, or a combination thereof. For manipulating the target object 112, the robotic system 100 can capture and analyze an image of a designated area, such as inside the truck, inside the container, or a pickup location for objects on the conveyor belt, to identify the target object 112 and the object source 114 of FIG. 1 thereof. Similarly, the robotic system 100 can capture and analyze an image of another designated area, such as a drop location for placing objects on the conveyor belt, a location for placing objects inside the container, or a location on the pallet for stacking purposes, to identify the task location 116 of FIG. 1.

In some embodiments, the sensor units 216 can include the system sensors 224. The system sensors 224 are devices to monitor the robotic units. For example, the system sensors 224 can include units or devices to detect and monitor positions of structural members, such as the robotic arms and the end-effectors, corresponding joints of robotic units or a combination thereof. As a further example, the robotic system 100 can use the system sensors 224 to track locations, orientations, or a combination thereof of the structural members and the joints during execution of the task. Examples of the system sensors 224 can include accelerometers, gyroscopes, or position encoders.

In some embodiments, the sensor units 216 can include the contact sensors 226, such as pressure sensors, force sensors, strain gauges, piezoresistive/piezoelectric sensors, capacitive sensors, elastoresistive sensors, torque sensors, linear force sensors, or other tactile sensors, configured to measure a characteristic associated with a direct contact between multiple physical structures or surfaces. For example, the contact sensors 226 can measure the characteristic that corresponds to a grip of the end-effector on the target object 112 or measure the weight of the target object 112. Accordingly, the contact sensors 226 can output a contact measure that represents a quantified measure, such as a measured force or torque, corresponding to a degree of contact or attachment between the gripper and the target object 112. For example, the contact measure can include one or more force or torque readings associated with forces applied to the target object 112 by the end-effector.

Figure 3A:
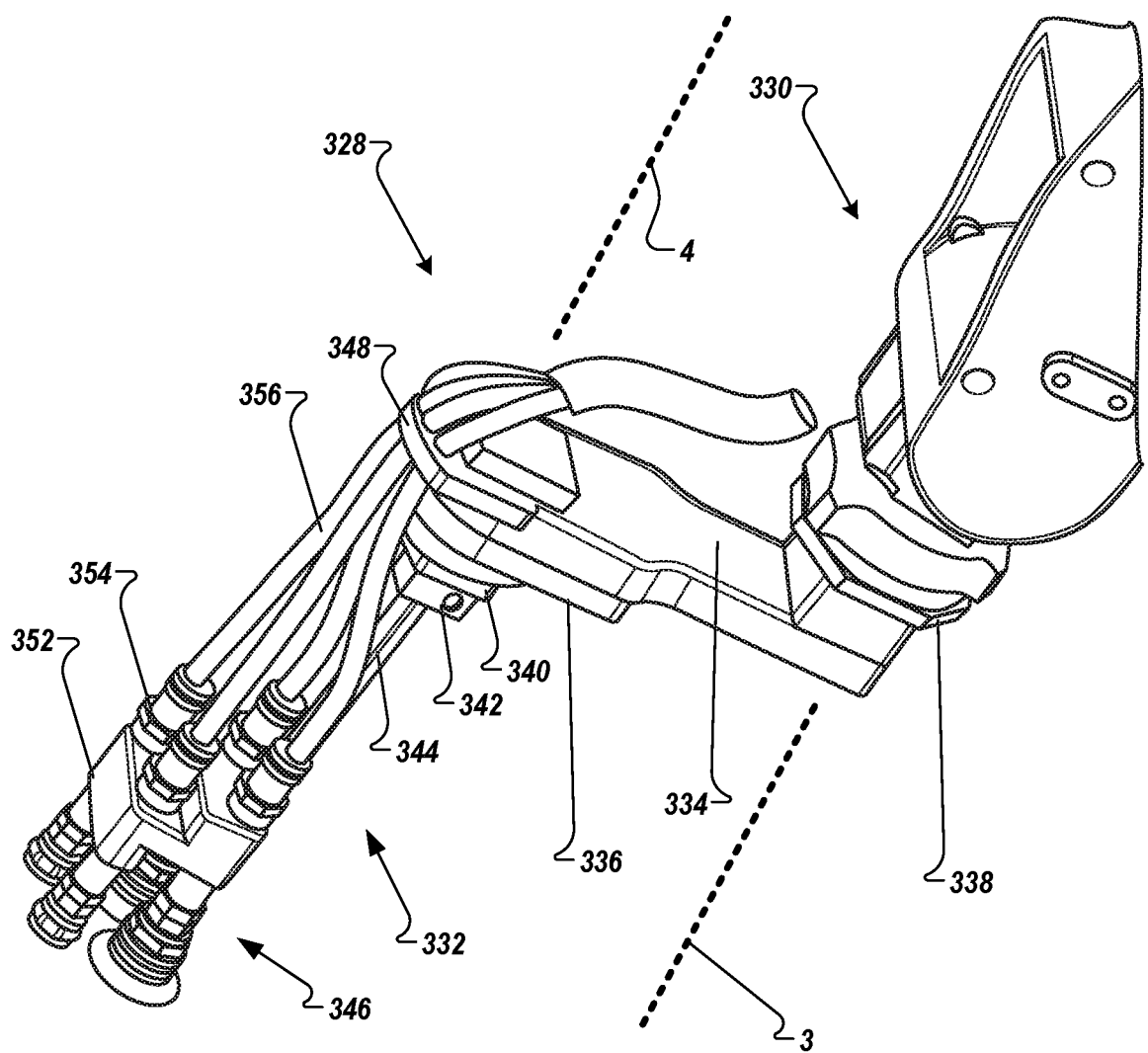
FIGS. 3A and 3B illustrate a robotic arm in accordance with example implementations of the present invention.
Figure 3B:
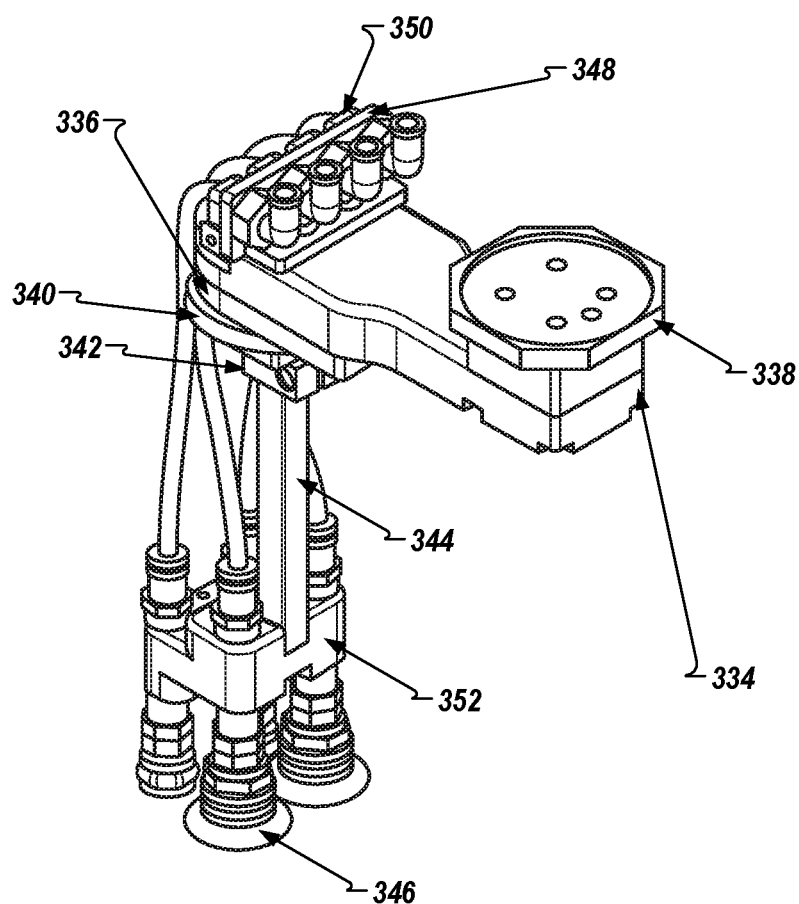

FIGS. 3A and 3B illustrate a robotic arm 330 having a gripper attachment 328 including an end-effector 332 in accordance with example implementations of the present invention. In example implementations, the robotic arm 330 can be configured to manipulate objects, such as picking objects from a container or placing objects at a destination, such as a conveyor or another container. The robotic system 100 of FIGS. 1 and 2 can include the robotic arm 330 having the gripper attachment 328 that includes the end-effector 332. The end-effector 332 is the portion of the robotic arm 330 that includes components configured to contact, manipulate, hold or grasp objects or any combination thereof. The portion of the end-effector 332 that contacts the object can be referred to as the gripper head.

The gripper attachment 328 includes an offset bracket 338 that connects the gripper attachment 328 to the robotic arm 330. The offset bracket 338 may provide mechanical coupling between the gripper attachment 328 and the robotic arm 330. In some example implementations, the offset bracket 338 may also provide electrical coupling to allow electrical signals to be exchanged between the robotic arm 330 and the gripper attachment 328. For example, the electrical signals may be exchanged between the robotic arm 330 and sensors and other components located on the gripper attachment 328.

The robotic arm 330 may rotate and actuate the offset bracket 338 using one or more actuation devices, such as the actuation device 212 illustrated in FIG. 2. The actuation device 212 may provide rotational actuation, torsional actuation, linear actuation, or any other type of actuation that might be apparent to a person of ordinary skill in the art.

The offset bracket 338 may connect to an offset plate 334 that provides a lateral offset between the robotic arm 330 and the end-effector 332. In other words, the offset plate 334 provides a lateral offset between the axis 3 of the robotic arm 330 and the axis 4 of the end-effector 332 mounted on the offset plate 334. The offset plate 334 may be formed from a material selected to provide structural support for the end-effector 332. In some example implementations, the offset plate 334 may be formed from metal such as a steel alloy, an aluminum alloy, or any other alloy that might be apparent to a person of ordinary skill in the art. In other example implementations, the offset plate 344 may be formed from a polymer material, composite material or ceramic material depending on an intended application or intended usage of the end-effector 332.

The end-effector 332 is connected to the offset plate 334 by a force torque bracket 340, which can include a force torque sensor 336. The force torque sensor 336 may measure force on the end-effector 332 to sense weight of an object being held or manipulated as well as sense any force caused by resistance or obstructions encountered by the end-effector 332 during operations. The offset plate 334 and offset bracket 338 and force torque bracket 340 may provide internal connections to provide tubes/gas channels and routing paths for wires to allow electrical connection between the robotic arm 330 and the end-effector 332.

In some example implementations, the force torque bracket 340 may also rotate and actuate end-effector 332 relative to the offset bracket 338 using one or more actuation devices, such as the actuation device 212 illustrated in FIG. 2. The actuation device 212 may provide rotational actuation, torsional actuation, linear actuation, or any other type of actuation that might be apparent to a person of ordinary skill in the art.

The force torque bracket 340 may connect to a head connector 342 that connects to the head extender 344 that supports a suction cup block assembly 346 of the end-effector 332. The head extender 344 may be a structural member that extends from the force torque bracket 340 to increase a length between an end of the robotic arm 330 and suction cup block assembly 346. Head extender 344 may enable the end-effector 332 to position the suction cup block assembly 346 to access objects in containers while providing clearance for the robotic arm 330 to maneuver without collision with the container or objects adjacent to the container.

The head connector 342 and the head extender 344 may be formed from a material selected to provide structural support for the end-effector 332. In some example implementations, the head connector 342 and the head extender 344 may be formed from metal such as a steel alloy, an aluminum alloy, or any other alloy that might be apparent to a person of ordinary skill in the art. In other example implementations, the head connector 342 and the head extender 344 may be formed from a polymer material, composite material or ceramic material depending on an intended application or intended usage of the end-effector 332.

The offset plate 334 also includes a tube bracket 348 that connects with air supplied from the robotic arm 330 and provides tube connectors 350 to distribute air to the suction cup block assembly 346. Tube connectors 350 may connect to air supply tubes 356 coupled to suction shaft interfaces 354 extending through a contact limit sensor apparatus 352 associated with the suction cup block assembly 346 of the end-effector assembly 346. More specifically, as an example, the suction cup block assembly 346 can include the contact limit sensor apparatus 352. The tube bracket 348 may restrain and position the air supply tubes 356 during operation of the robotic arm 330 to prevent crimping or crushing of the air supply tubes 356. The contact limit sensor apparatus 352 can be a sensor that may prevent the end-effector 332 from applying contact pressure that may potentially damage the object by contact. Details regarding the contact limit sensor apparatus 352 will be discussed below.

In some example implementations, the tube connectors 350 may connect to one or more vacuum sources (not shown) to provide suction to the section shaft interfaces 354 of the suction cup block assembly 346 of the end-effector 332. For example, the tube connectors 350 may be connected to one or more vacuum ejectors that generate vacuum pressure using compressed air. For example, a vacuum ejector may allow compressed air to be passed through a nozzle shaped to create a low-pressure zone that provides vacuum pressure to suction cup block assembly 346.

The generated vacuum pressure may be provided from the tube connectors 350 to the suction shaft interfaces 354 through the air supply tubes 356. The vacuum pressure provided to the suction shaft interfaces 354 may be provided to the suction cup block assembly 346 to provide suction to grip and release an object or to otherwise secure, affix, and release objects to and from the end-effector 332. The operation of the suction cup block assembly 346 is discussed in greater detail below.

The end-effector 332 can be manipulated by operating the actuation devices, such as those actuation devices 212 of FIG. 2, connected to the structural members of the robotic arm 330, joints of the robotic arm 330, and the brackets (e.g., offset bracket 338, force torque bracket 336) or a combination thereof. The end-effector 332 can be operated to grab or release objects by operating one or more of the actuation devices 212 associated with or attached to one or more portions of the end-effector 332. The end-effector 332 can grip and release objects using the vacuum pressure provided to the suction cup block assembly 346, thereby securing, affixing, or releasing the object to or from the end-effector 332.

Figure 4A:
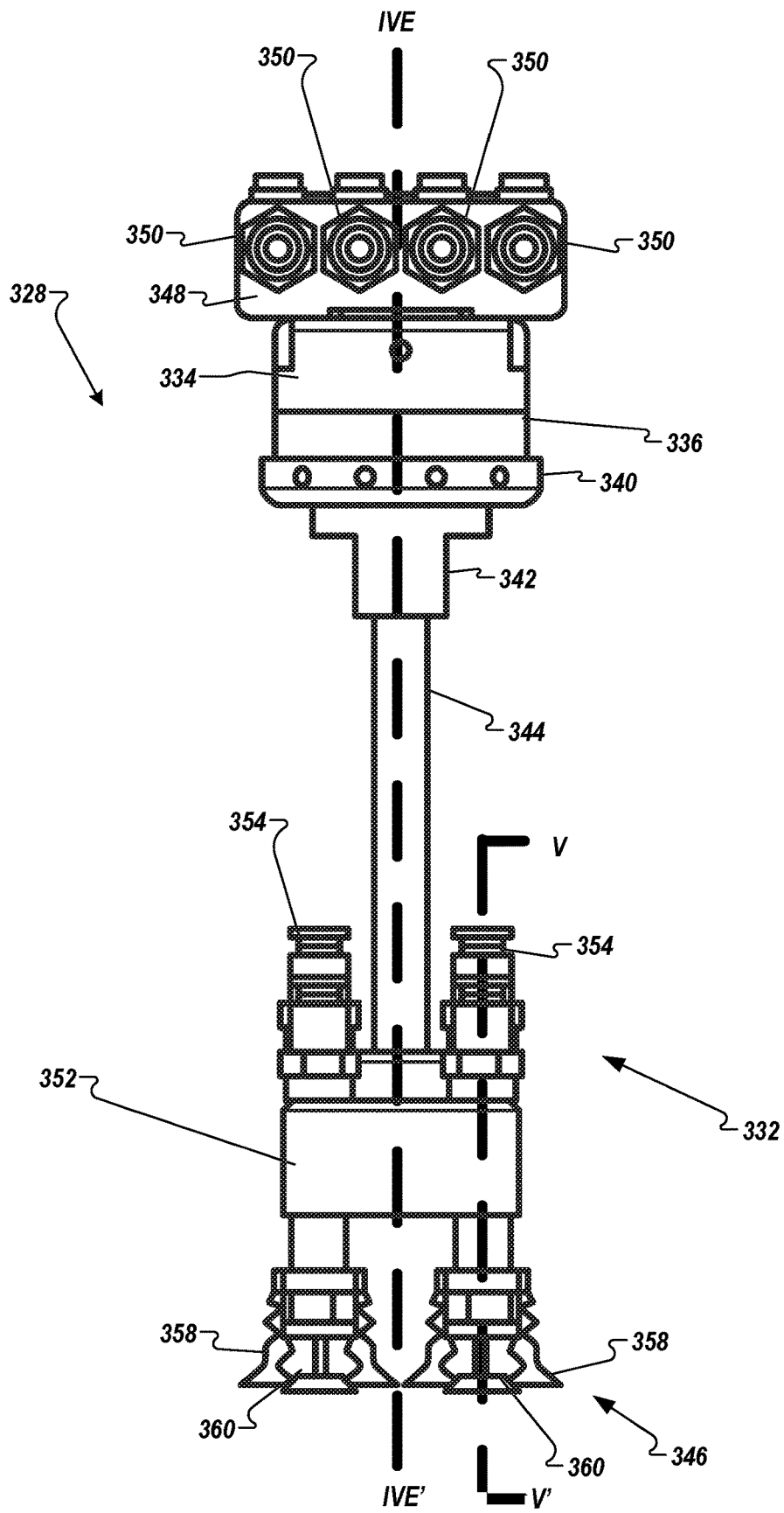
FIGS. 4A-4E illustrate various views of the end-effector of the robotic arm in accordance with example implementations of the present invention.
Figure 4B:
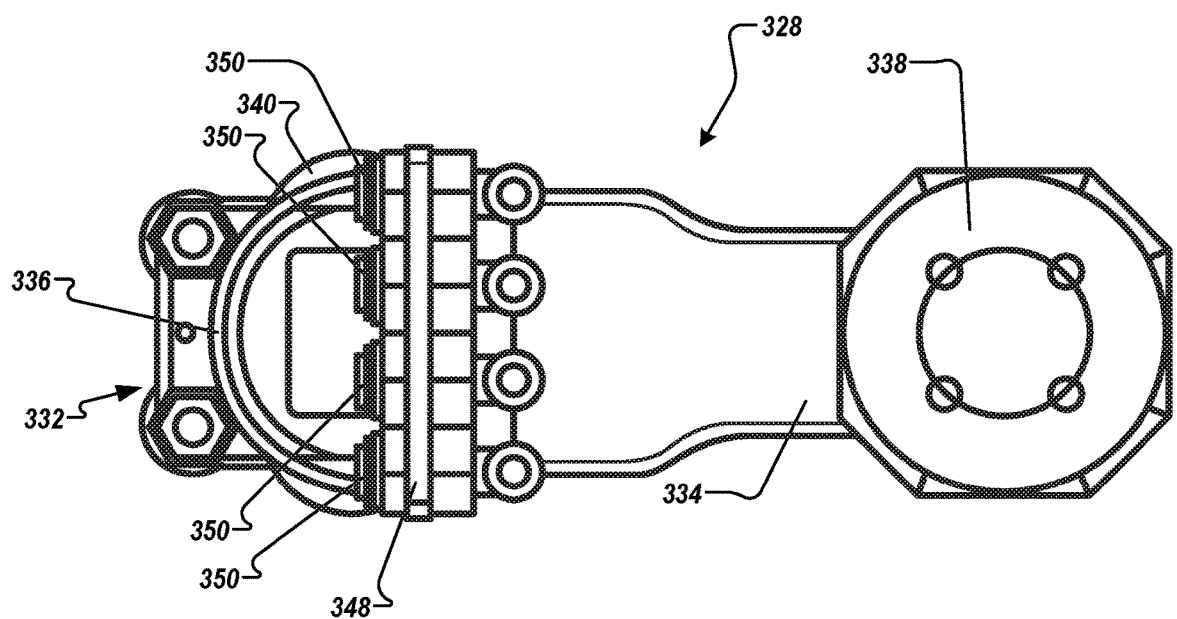
Figure 4C:
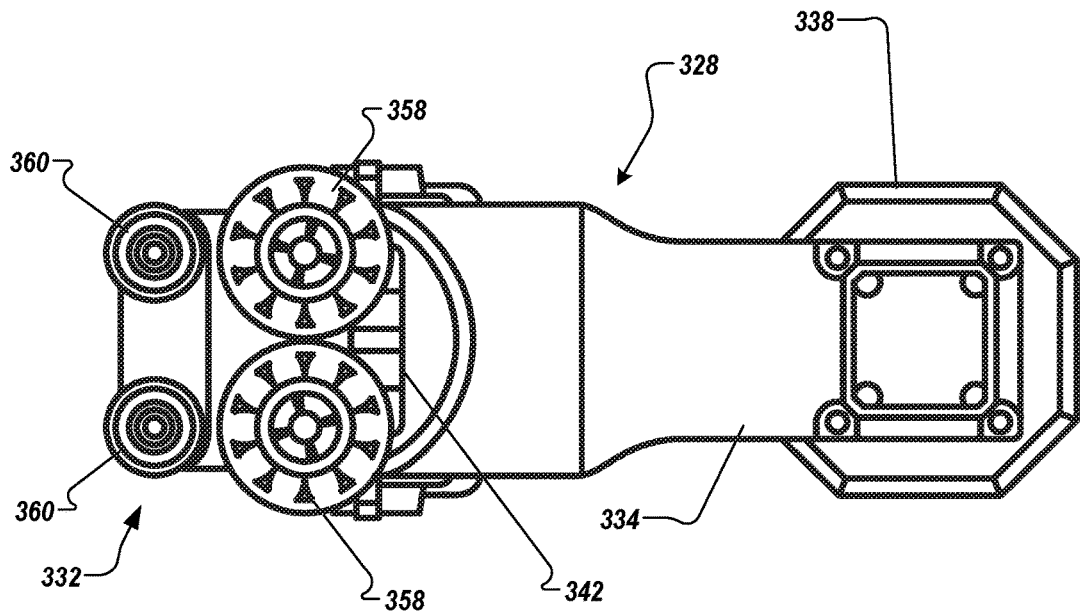
Figure 4D:
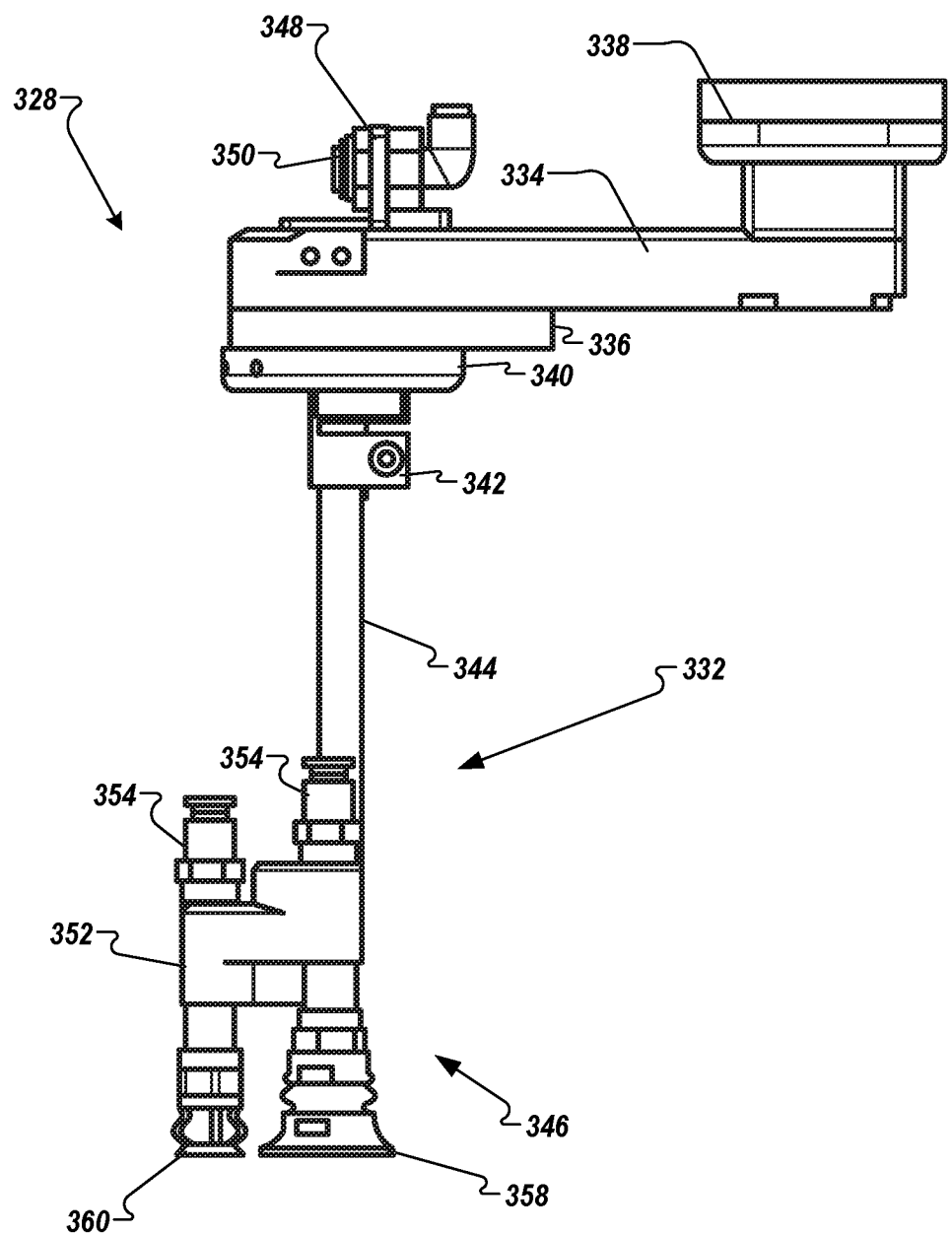
Figure 4E:
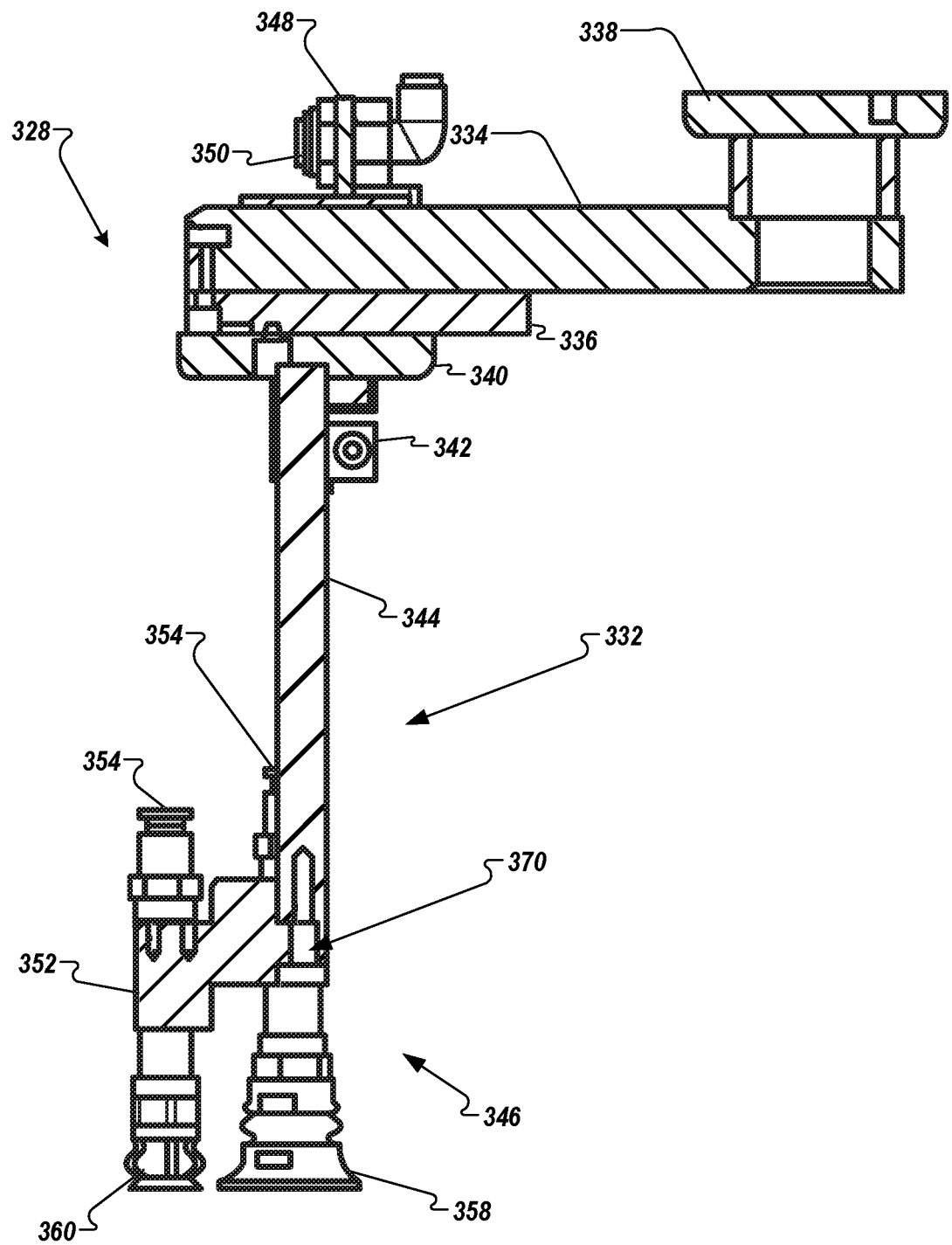

FIGS. 4A-4E illustrate various views of the end-effector 332 of the robotic arm 330 in accordance with example implementations of the present invention. In the various views, FIG. 4A illustrates a front view of the end-effector 332, and FIG. 4B illustrates a top view of the end-effector 332. Further, FIG. 4C illustrates a bottom view of the end-effector 332 and FIG. 4D illustrates a side view of the end-effector 332. FIG. 4E illustrates a sectional view of the end-effector 332 of FIG. 4A taken along line IVE-IVE'.

As illustrated, the tube bracket 348 may be positioned on a side of the offset plate 334 opposite the force torque bracket 340 and the force torque sensor 336. The air supply tubes 356 of FIGS. 3A and 3B are omitted in FIGS. 4A-4E to allow better visualization of the tube connectors 350 and the suction shaft interfaces 354. As illustrated, the tube connectors 350 extend forward from the tube bracket 348.

The force torque bracket 340 may be mechanically coupled to the head connector 342 to translate any force or torque from the head extender 344 to the force torque sensor 336. In some example implementations, the force torque sensor 336 may be a type of contact sensor like the contact sensor 226 of FIG. 2.

As illustrated, the head extender 344 may be coupled to the head connector 342 by a clamp fitting. However, in other example implementations the head extender 344 may be coupled to the head connector 342 by press fitting, screw fitting, welding, adhesive, or any other mechanical coupling mechanism that might be apparent to a person of ordinary skill in the art.

The head extender 344 may be mechanically coupled to the end-effector 332 to translate any force or torque from the suction cup block assembly 346 of the end-effector 332 to the force torque sensor 336. As illustrated, the head extender 344 may be coupled to the suction cup block assembly 346 by an attachment screw 370. However, in other example implementations, the head extender 344 may be coupled to the suction cup block assembly 346 by press fitting, clamp fitting, welding, adhesive, or any other mechanical coupling mechanism that might be apparent to a person of ordinary skill in the art. Thus, any force or torque experienced by the suction cup block assembly 346 is translated to the force torque sensor 336 by the force torque bracket 340, head connector 342 and head extender 344.

The structure that may include the force torque sensor 336 by the force torque bracket 340, head connector 342 and/or head extender 344 may allow impacts or bumps to the suction cup block assembly 346 to be translated to the force torque sensor 336 to provide feedback to the robot arm 330. The force torque sensor 336 may also measure weight of objects (e.g., a target object 112 of FIG. 1) being grasped or held by the suction cup block assembly 346 as well as weight shifts in the object as the suction cup block assembly 346 is being moved or positioned.

Further in some example implementations, the end-effector 332 may also include one or more additional sensor units. For example, one or more of the contact sensors 226 of FIG. 2 can be attached to or integrated within the end-effector 332. In some example implementations, the contact sensors 226 can be a force, pressure, torque, and/or other tactile sensors, attached to or integrated with the end-effector 332, in addition to the force-torque sensor 336 attached to the end of the offset plate 334 opposite the offset bracket 338. In another example implementation, the contact sensors 226 can include separate linear force sensors configured to measure the weight of the object (e.g., the target object 112 of FIG. 1) held or supported by the suction cup block assembly 346. Additional examples of sensor units (e.g., contact limit sensor 366 of FIG. 6) will be discussed below.

The suction cup assembly 346 may include multiple suction shaft interfaces 354 extending upward from the contact limit sensor apparatus 352. Each of the suction shaft interfaces 354 is communicatively coupled to either a suction cup 358 or a suction cup 360. In some example implementations, the suction cup 358 may have a larger relative diameter than the suction cup 360. Having two different sizes of the suction cups 358 and 360 may allow flexibility in gripping or grasping objects by the suction cup assembly 346. For example, the smaller relative size of the suction cups 360 may better grip smaller or irregularly shaped objects due to the smaller size. Further, the larger relative size of the suction cups 358 may achieve higher grip strength for gripping and manipulating larger objects as the grip force is a product of the vacuum pressure and the surface area of the suction cup.

In the illustrated implementations, the suction cup assembly 346 is shown with four total suction cups (358 & 360) having two different relative sizes. However, example implementations of the present invention may include more than four total suction cups or less than four total suction cups. Similarly, more than two different relative sizes of suction cups may be provided in some example implementations. Alternatively, a single size of suction cups may be provided.

Figure 5:
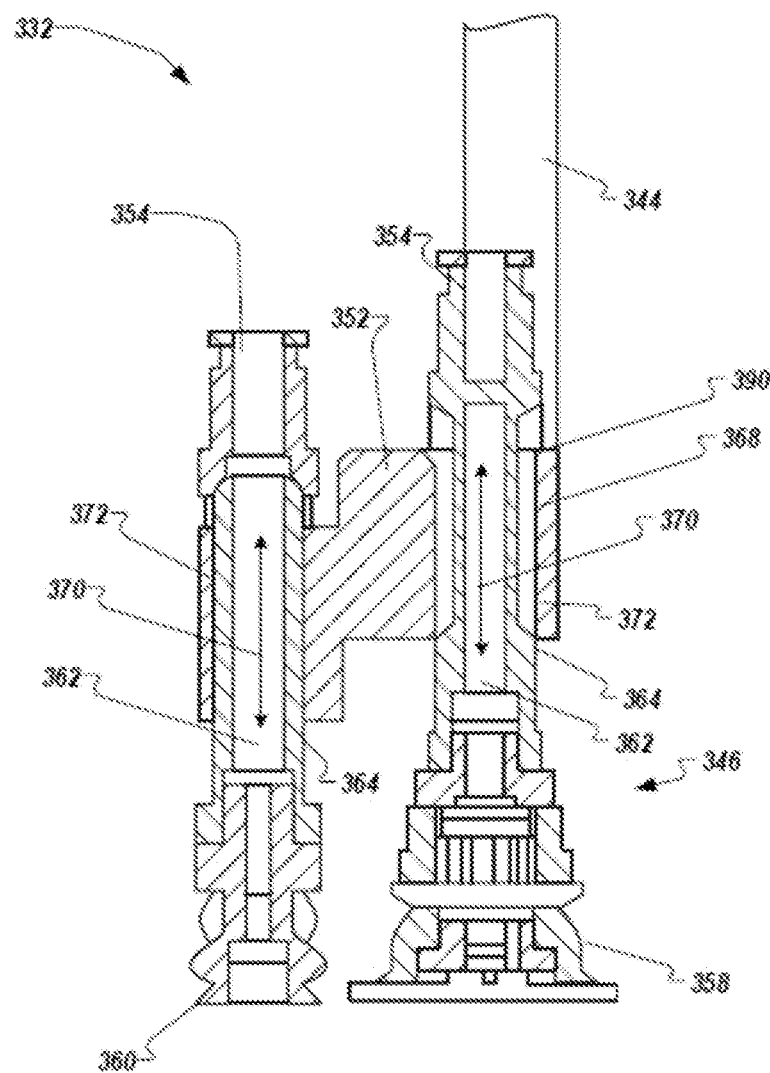
FIG. 5 illustrates a sectional view of the end-effector of FIG. 4A taken along line V-V'.

FIG. 5 illustrates a sectional view of the end-effector 332 of FIG. 4A taken along line V-V'. As illustrated, the end-effector 332 includes the head extender 344 connecting the suction cup block assembly 346 to the offset plate 334. As discussed above, the suction cup block assembly 346 includes multiple suction shaft interfaces 354 extending upward from the contact limit sensor apparatus 352, each of the suction shaft interfaces 354 are communicatively coupled to either the suction cup 358 or the suction cup 360. In some example implementations, the suction cup 358 may have a larger relative diameter than the suction cup 360.

As illustrated in FIG. 5, the suction cup block assembly 346 also includes a suction shaft 362 that communicatively couples to the suction shaft interface 354 to one of the suction cups 358 & 360. As the suction shaft interfaces 354 are connected to vacuum pressure sources by the air supply tubes 356, vacuum pressure from the air supply tubes 356 is passed through the suction shaft 362 to the suction cups 358 and 360 generating sufficient suction to pick-up objects. In some example implementations, the suction shafts 362, suction cups 358/360, and suction shaft interfaces 354 may be movable relative to the contact limit sensor apparatus 352. For example, the contact limit sensor apparatus 352 may include a housing 368 that the suction shafts 362 can slide through in a vertical direction allowing the suction cups (358/360), located below the housing 368, and the suction shaft interfaces 354, located above the uppermost surface 390 of the housing 368, to move relative to the housing as illustrated by arrows 370.

Additionally, the suction cup block assembly 346 may also include a displacement recovery mechanism 364, which provides a biasing force to restore the suction cups 358 & 360, suction shafts 362 and suction shaft interfaces 354 to a default position after displacements relative to the housing 368 of the suction cup assembly block 346. In some example implementations, the displacement recovery mechanism 364 can be a spring, such as a compression spring, a volute spring, a gas spring or other biasing mechanism that might be apparent to a person of ordinary skill in the art. The displacement recovery mechanism 364 may be positioned or housed inside of an outer covering 372 (e.g., an external tube) of the suction shaft 362. Thus, the displacement recovery mechanisms 364 may enable the suction cups 358/360 to return to a default position after being displaced due to contacting an object or obstruction during operations.

Each of the suction shafts 362 and/or the displacement recovery mechanisms 364 can be routed through the contact limit sensor apparatus 352. In some embodiments, routing of the suction shafts 362 through the contact limit sensor apparatus 352 may fix the horizontal position of the suction shafts 362 and the suction cups 385/360 relative to one another.

Figure 6A:
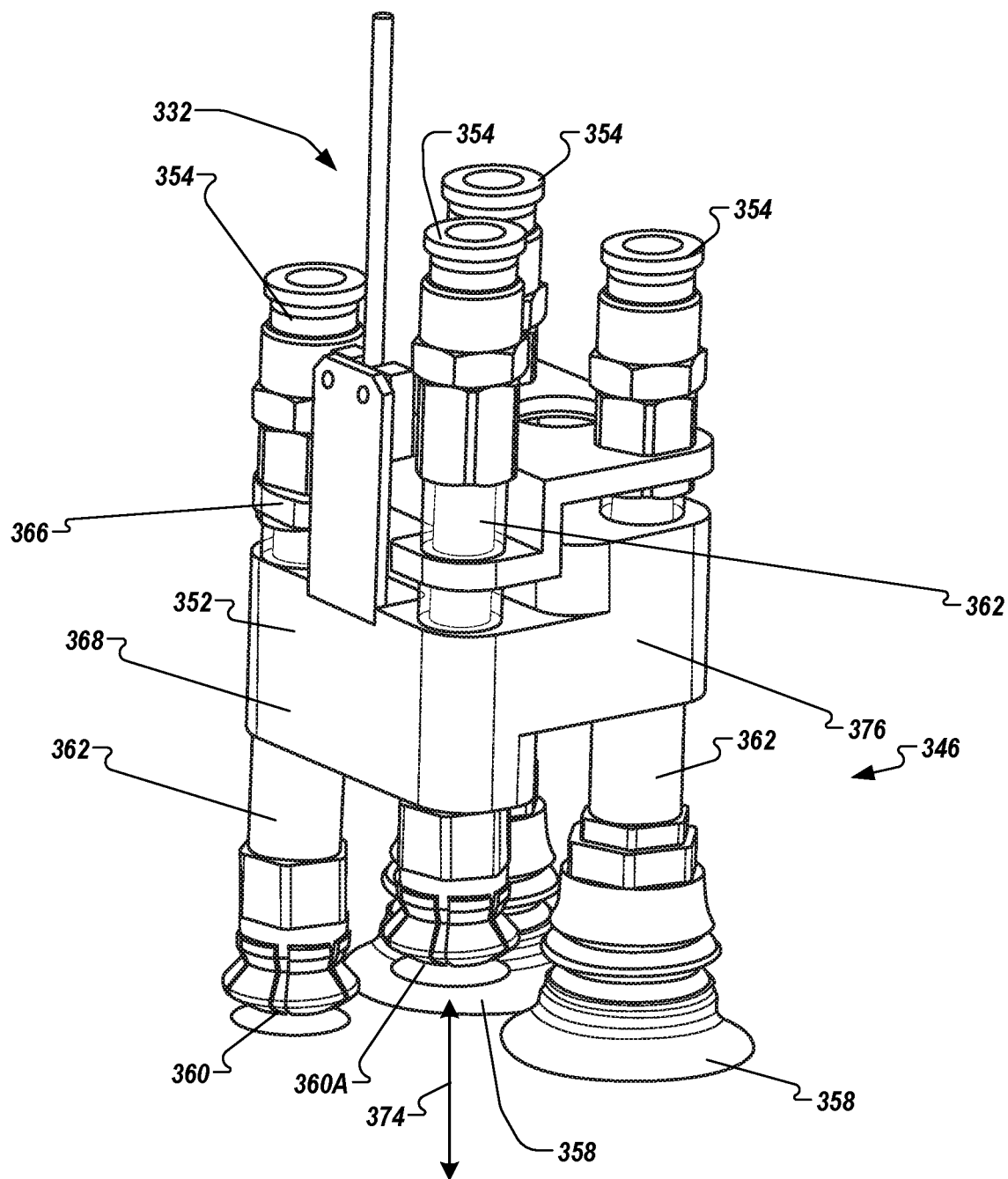
FIGS. 6A-6F are perspective views of an end-effector in accordance with example implementations of the present invention.
Figure 6B:
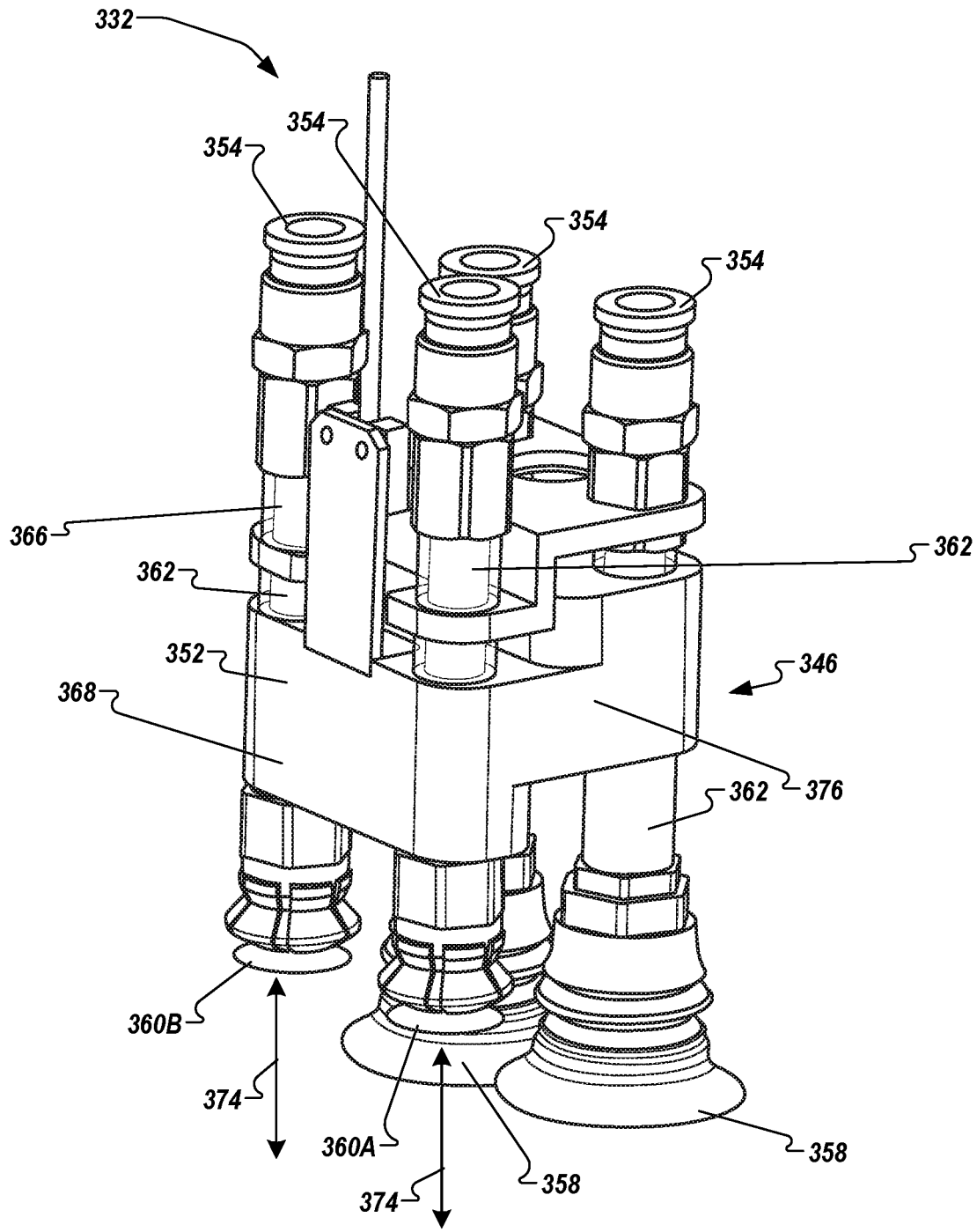
Figure 6C:
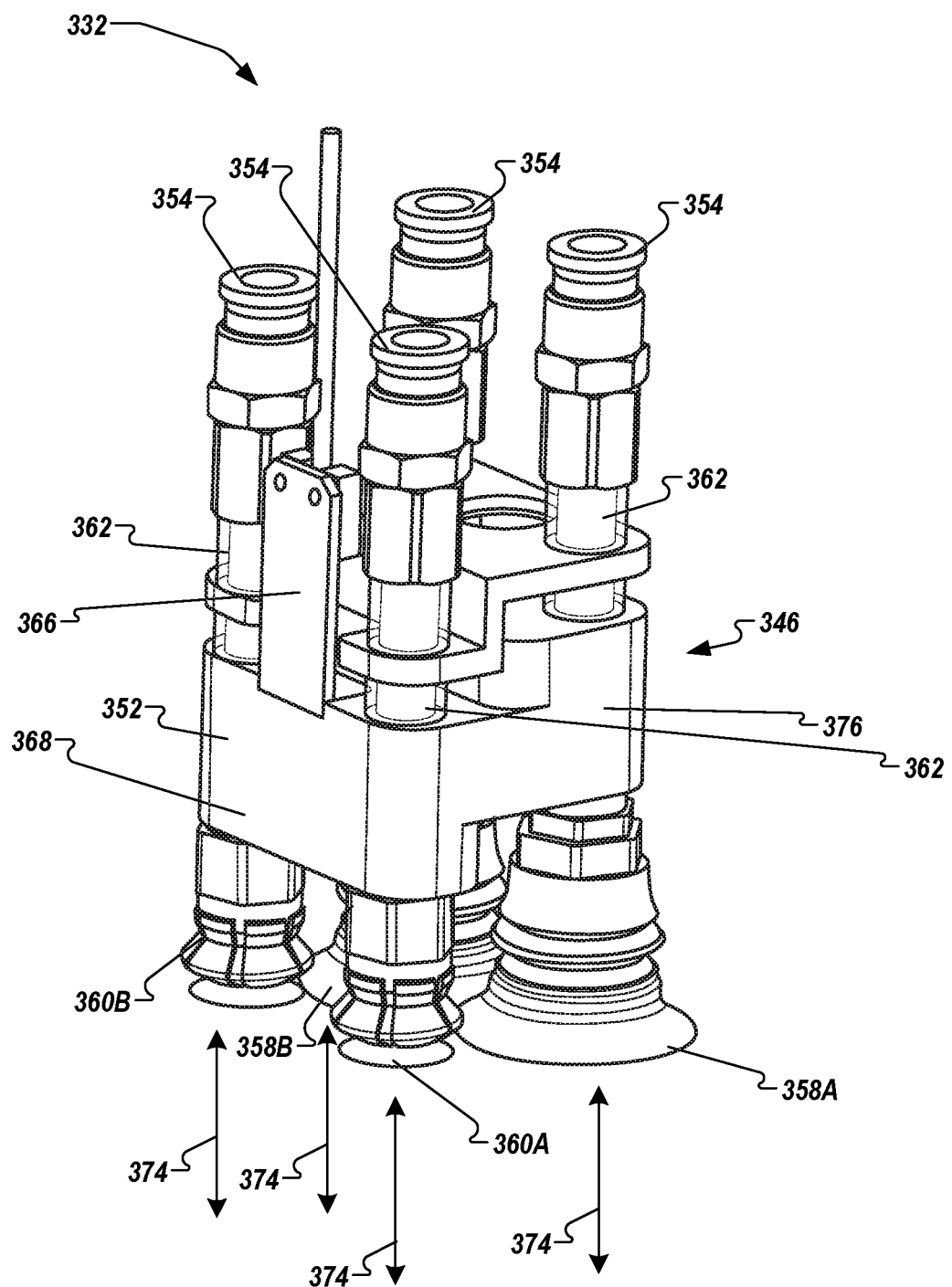
Figure 6D:
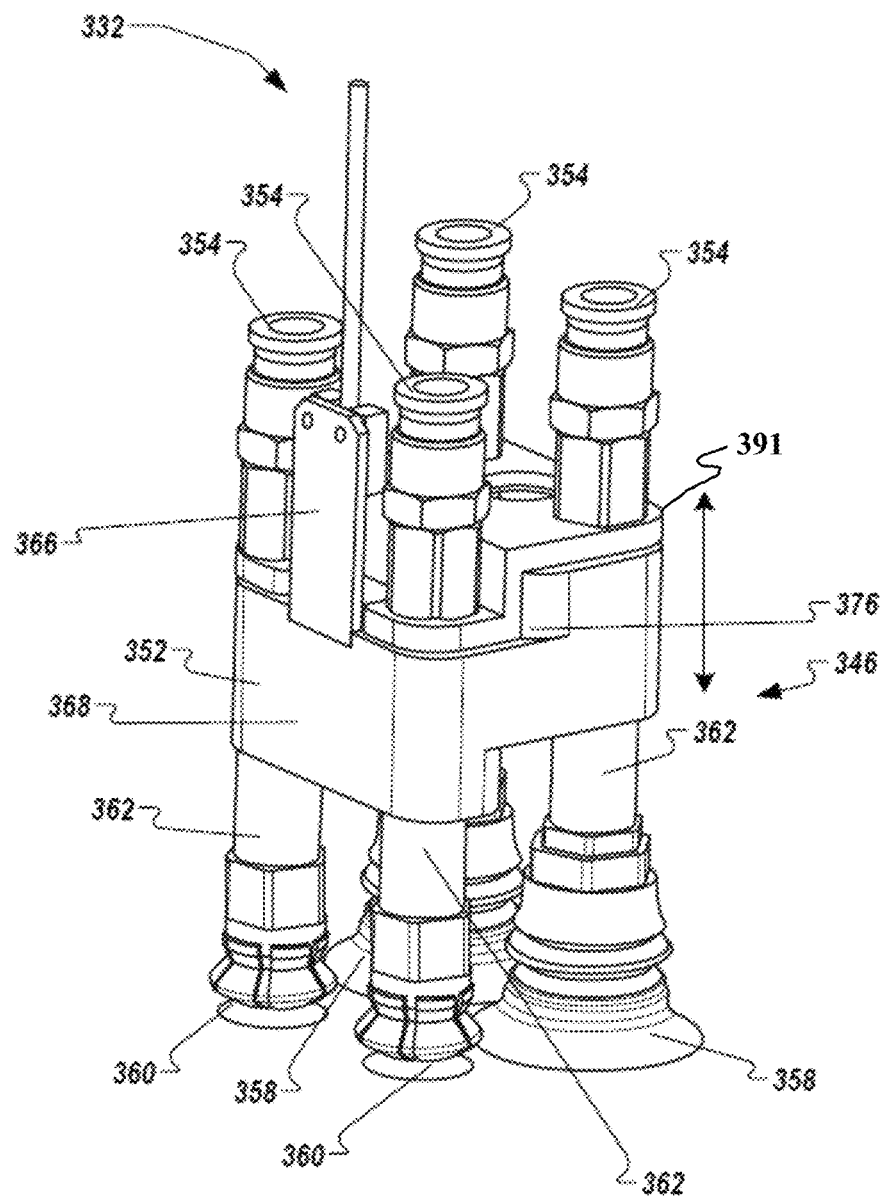
Figure 6E:
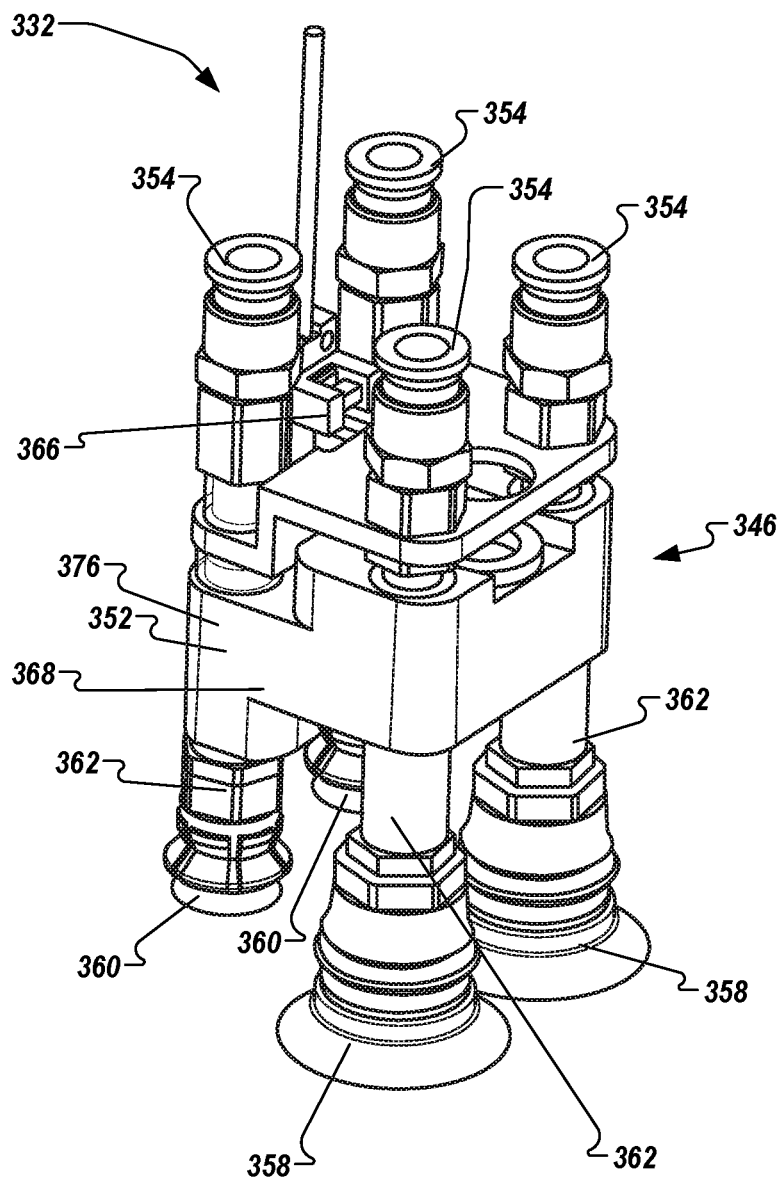
Figure 6F:
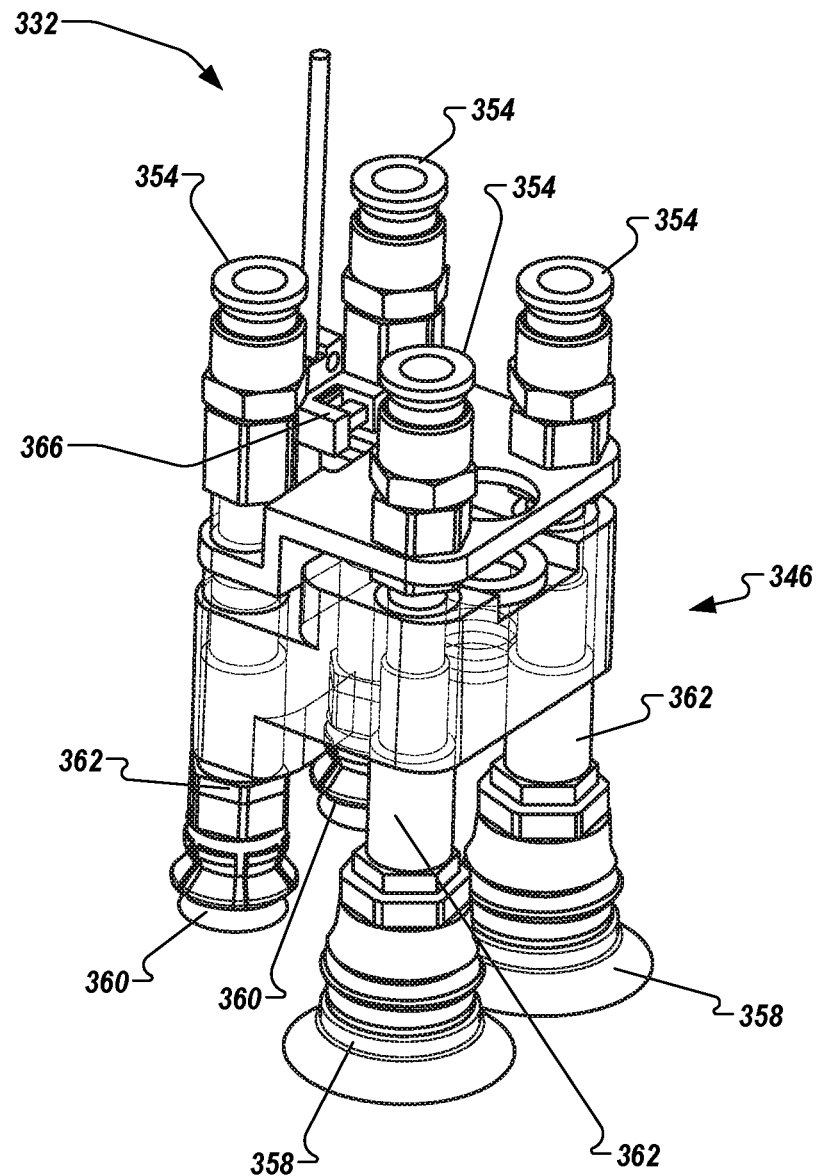

FIGS. 6A-6F are perspective views of the end-effector 332 illustrating displacement of suction cups 358/360 of the end-effector 332 in accordance with example implementations of the present invention. FIG. 6A depicts one of the suction cups (suction cup 360A) displaced upward from a default position. FIG. 6B depicts two of the suction cups (suction cups 360A and 360B) displaced from the default position. FIG. 6C depicts all four of the suction cups (suction cups 360A, 360B, 358A and 358B) all displaced from the default position. FIG. 6D depicts displacement of the contact limit sensor apparatus 352 up to a stopper plate 391 located above the contact limit sensor apparatus 352. FIG. 6E is a view of the backside of the end-effector 332 of FIG. 6B, which depicts two of the suction cups (suction cups 360A and 360B) displaced from the default position. FIG. 6F is the end-effector 332 of FIG. 6E with the contact limit sensor apparatus 352 illustrated as transparent.

As illustrated, the end-effector 332 may include suction cups 358/360 at a default position. The default position for each of the suction cups 358/360 may share a common horizontal plane. As discussed above, the end-effector 332 may be configured to allow each of the suction cups 358/360 to be displaced independently from one another relative to the contact limit sensor apparatus 352 from a default position. For example, each suction cup 358/360 may be displaced due to pressure or force on the suction cups 358/360 when one or more of the suction cups 358/360 contact an object. Each of the suction cups 358/360 can be displaced independent of the other suction cups 358/360. FIG. 6A illustrates the suction cup 360A being displaced independently relative to the other suction cups 358/360. FIG. 6B illustrates the suction cups 360A and 360B displaced independently relative to the suction cups 358. FIG. 6C illustrates all four suction cups (360A, 360B, 358A, and 358C) all displaced. The displacement direction can be along the axis 374 of the suction shafts 362 (e.g., perpendicular to the ends of the suction cups 358/360/bases of the shaft cylinder). FIG. 6E illustrates the displacement of the two suction cups (suction cups 360A and 360B) of FIG. 6B from a reversed view and FIG. 6F illustrates the same displacement of the two suction cups (suction cups 360A and 360B) of FIG. 6B with the contact limit sensor apparatus 352 illustrated as transparent.

In other words, the independent displacement for each of the suction cups (i.e. 360A, 360B, 358A, and 358C of FIG. 6C) may enable each of the suction cups 358/360 to be at different relative positions from one other. The independent displacement can enable the end-effector 332 to accommodate or conform to objects that have varying surface contours (i.e. non-uniform/irregular surfaces), such as bags and other flexible containers.

In some example implementations, the contact limit sensor apparatus 352 may also be displaced. For example, the contact limit sensor apparatus 352 may be displaced from the initial position illustrated in FIGS. 6A-6C, to a contact limited position illustrated in FIG. 6D. In some embodiments, the displacement of the contact limit sensor apparatus 352 from the initial or default position of FIGS. 6A-6C to the contact limit position of FIG. 6D may be caused by the displacement of one or more of the suction cups 358/360. In some example implementations, displacement of the contact limit sensor apparatus 352 to the contact limited position as a result of displacement by one or more of the suction cups 358/360 may correspond to the suction cup 358/360 applying pressure to the object exceeding a contact threshold that could potentially damage the object (also referred to as a contact limit).

The amount of displacement by the contact limit sensor apparatus 352 can be registered by a contact limit sensor 366 that transmits a signal (e.g., contact information) to the control unit 202 of FIG. 2 to prevent further application of pressure by the end-effector 332 on the object when the contact threshold is reached. The end-effector 332 may be prevented from moving further toward the object when the contact limit sensor 366 detects that the contact threshold (e.g., contact limit) has been reached. By providing an end-effector 332 with a contact limit sensor apparatus 352 may achieve the advantage that only a single sensor may determine whether the end-effector 332 has exceeded the contact limit on an object due to displacement of any one of the suction cups 358/360 causing the contact limit sensor apparatus 352 to be displaced to the contact limit position.

In some example implementations, as illustrated in FIGS. 6a-6f, the suction cups 360 having the smaller relative size (e.g., the front pair of suction cups) may be used to grip smaller objects or objects that can be easily damaged (e.g., delicate objects) while the suction cups 358 having larger relative size (e.g., the rear pair of suction cups) may be used to grip larger objects or objects that are less likely to be damaged.

Further, in some example implementations, the housing 368 of contact limit sensor apparatus 352 may include an offset step 376 that provides a greater displacement distance for suction cups 358 of larger relative size (also referred to as the larger cups) than the displacement distance for the suction cups 360 of smaller relative size (also referred to as the smaller cups). For example, since the smaller cups can be used for the delicate objects, less force or pressure should be applied before reaching the contact limit to prevent damaging. Thus, the contact limit position can be reached by the smaller cups before that of the larger cups, which can be achieved by the offset/step 372 in the contact limit sensor apparatus 352.

Figure 7:
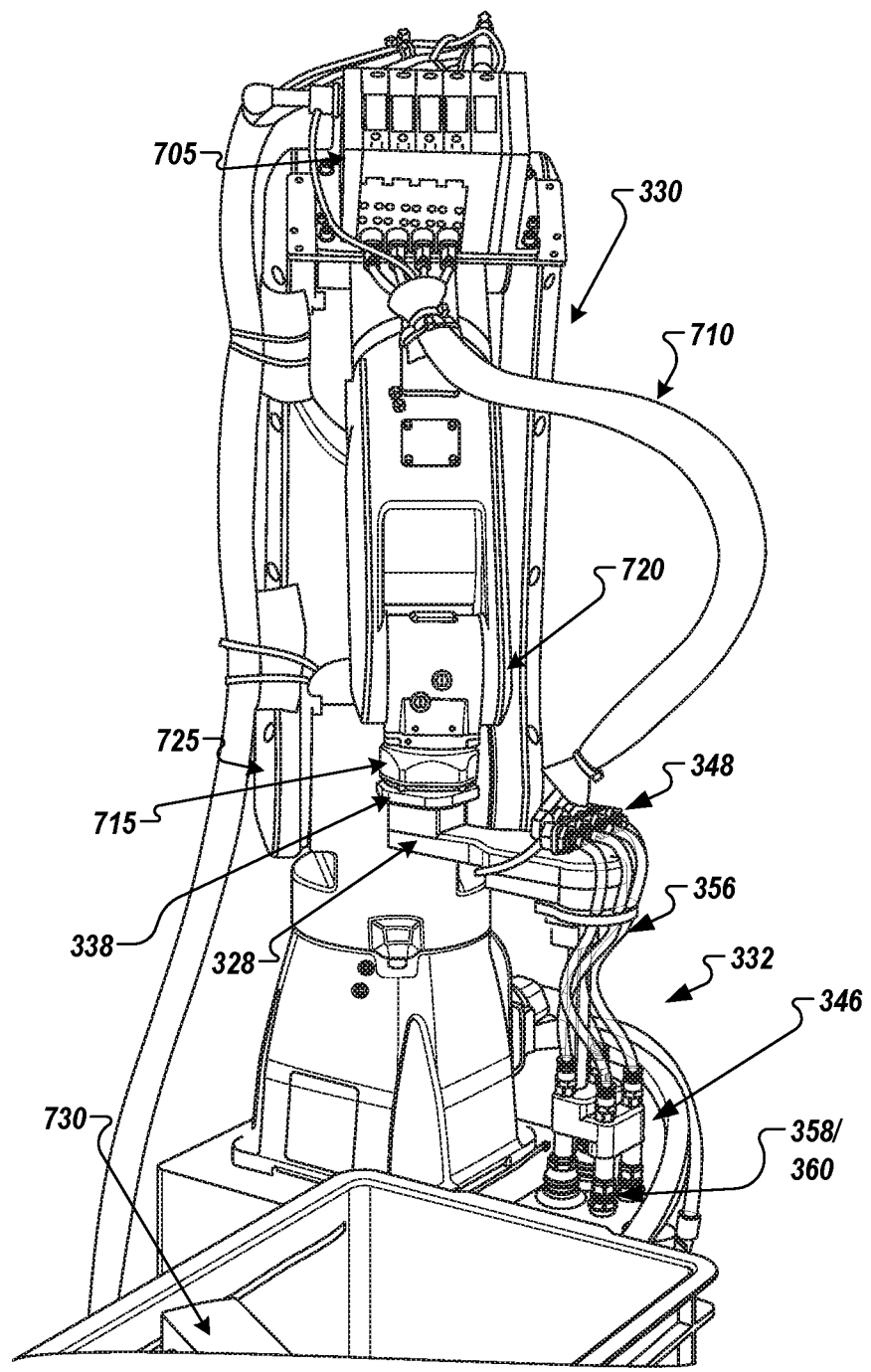
FIG. 7 illustrates a perspective view of a robotic arm in accordance with example implementations of the present invention.

FIG. 7 illustrates a perspective view of a robotic arm 330 in accordance with example implementations of the present invention. As illustrated, the robotic arm 330 includes a compressed air supply 705 coupled to the end-effector 332 of the gripper attachment 328. Specifically, the compressed air supply 705 may be connected to the tube bracket 348 by fluid supply tubes 710. The compressed air supply 705 may be used to provide vacuum pressure to the tube bracket 348, which provides the vacuum pressure to the suction cups 358/360 of the suction cup block assembly 346.

As illustrated, the offset bracket 338 of the gripper assembly 328 may be attached to the robotic arm 330 by an actuator 715 that allows actuation of the gripper assembly 328 through rotation of in a horizontal plane. The actuator 715 may be coupled to a second actuator 720 that allows actuation of the gripper assembly 328 through rotation in a vertical plane. A third actuator 725 may be coupled to second actuator 720 to allow further actuation of the gripper assembly 328. Collectively, the actuators 715, 720, and 725 may allow the robotic arm 330 to maneuver the end-effector 332 of the gripper attachment 328 to grasp an object 730 so the object 730 may be picked-up, repositioned, or moved.

The resulting method, process, apparatus, device, product, and/or system of the present invention is cost-effective, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

Although a few example embodiments have been shown and described, these example embodiments are provided to convey the subject matter described herein to people who are familiar with this field. It should be understood that the subject matter described herein may be implemented in various forms without being limited to the described example embodiments. The subject matter described herein can be practiced without those specifically defined or described matters or with other or different elements or matters not described. It will be appreciated by those familiar with this field that changes may be made in these example embodiments without departing from the subject matter described herein as defined in the appended claims and their equivalents.

What is claimed is:

1. A robotic system comprising:
    an end-effector configured for grasping an object, the end-effector including:
    a suction cup assembly including a housing and configured to engage the object;
    a contact limit sensor apparatus, including a contact limit sensor, configured to detect a pressure associated with the engagement between the suction cup assembly and the object based on registering an amount of displacement of the housing, wherein the contact limit sensor transmits contact information when the contact limit sensor detects the pressure exceeding a contact threshold;
    a sensor unit monitoring contact information received from the contact limit sensor;
    a stopper plate located above the contact limit sensor apparatus; and
    a controller, coupled to the sensor unit, configured to execute an operation for controlling the end-effector to limit movement of the end-effector toward the object based on the contact information received,
    wherein the suction cup assembly further includes:
        a first suction cup coupled to a vacuum pressure generating source via a first suction shaft movable through the housing to displace the first suction cup relative to the housing; and
        a second suction cup coupled to the vacuum pressure generating source via a second suction shaft movable through the housing to displace the second suction cup relative to the housing,
    wherein, in a moving direction of the second suction shaft, an amount of a protrusion of the second suction shaft, from an uppermost surface of the housing toward the vacuum pressure generating source, is more than an amount of a protrusion of the first suction shaft from the uppermost surface of the housing toward the vacuum pressure generating source, and
    wherein the housing is configured to be displaced up to the stopper plate, in the moving direction of the second suction shaft, from an initial position to a contact limit position,
    wherein the housing includes an offset step including:
        a first upper surface of the housing through which the first suction shaft passes on opposing sides of the housing;
        a second upper surface of the housing through which the second suction shaft passes on opposing sides of the housing; and
        a side surface that connects the first upper surface of the housing to the second upper surface of the housing, and
    wherein, with respect to a bottommost surface of the housing, the second upper surface of the housing is located higher than the first upper surface of the housing;
    wherein the stopper plate includes another offset step including:
        a first bottom surface of the stopper plate located above the first upper surface of the housing;
        a second bottom surface of the stopper plate located above the second upper surface of the housing;

another side surface that connects the first bottom surface of the stopper plate to the second bottom surface of the stopper plate, and wherein, with respect to the bottommost surface of the housing, the second bottom surface of the stopper plate is located higher than the first bottom surface of the stopper plate.

2. The robotic system of claim 1, wherein the contact limit sensor is configured to detect the pressure associated with the engagement between the suction cup assembly and the object based on a displacement of the first suction cup relative to the housing.

3. The robotic system of claim 2, wherein the second suction cup is displaceable relative to the housing independent of the first suction cup; and wherein the contact limit sensor is further configured to detect the pressure associated with the engagement between the suction cup assembly and the object based on displacement of the second suction cup relative to the housing.

4. The robotic system of claim 3, wherein the first suction cup has a smaller size relative to a size of the second suction cup, wherein the housing includes an offset step configured to permit a greater displacement of the second suction cup relative to the housing than a permitted displacement of the first suction cup, wherein the contact limit sensor is configured to detect the pressure associated with the engagement between the suction cup assembly and the object based on the permitted displacement of the first suction cup and/or the second suction cup.

5. The robotic system of claim 2, wherein the first suction cup is communicative coupled to the first suction shaft and the vacuum pressure generating source, and wherein the second suction shaft is movable toward the vacuum pressure generating source more than the first suction shaft.

6. The robotic system of claim 5, wherein the suction cup assembly further includes:

a displacement recovery mechanism configured to bias the first suction shaft into a default position relative to housing, and wherein the contact limit sensor is configured to detect the pressure associated with the engagement between the suction cup assembly and the object based on a pressure to overcome the bias provided by the displacement recovery mechanism.

7. The robotic system of claim 1, further comprising a force torque sensor configured to measure a force applied by the end-effector.

8. An object handling unit comprising:

a robotic arm; and an end-effector configured for grasping an object, the end-effector including:

a suction cup assembly including a housing and configured to engage the object; and a contact limit sensor apparatus, including a contact limit sensor, configured to detect a pressure associated with the engagement between the suction cup assembly and the object based on registering an amount of displacement of a housing; and a stopper plate located above the contact limit sensor apparatus, wherein the contact limit sensor transmits contact information when the contact limit sensor detects the pressure exceeding a contact threshold, wherein the transmitted contact information causes movement of the end-effector toward the object to be limited, wherein the suction cup assembly further includes:

a first suction cup coupled to a vacuum pressure generating source via a first suction shaft movable through the housing to displace the first suction cup relative to the housing; and a second suction cup coupled to the vacuum pressure generating source via a second suction shaft movable through the housing to displace the second suction cup relative to the housing, wherein, in a moving direction of the second suction shaft, an amount of a protrusion of the second suction shaft, from an uppermost surface of the housing toward the vacuum pressure generating source, is more than an amount of a protrusion of the first suction shaft from the uppermost surface of the housing toward the vacuum pressure generating source, and wherein the housing is configured to be displaced up to the stopper plate, in the moving direction of the second suction shaft, from an initial position to a contact limit position, wherein the housing includes an offset step including:

a first upper surface of the housing through which the first suction shaft passes on opposing sides of the housing;

a second upper surface of the housing through which the second suction shaft passes on opposing sides of the housing; and a side surface that connects the first upper surface of the housing to the second upper surface of the housing, and wherein, with respect to a bottommost surface of the housing, the second upper surface of the housing is located higher than the first upper surface of the housing;

wherein the stopper plate includes another offset step including:

a first bottom surface of the stopper plate located above the first upper surface of the housing;

a second bottom surface of the stopper plate located above the second upper surface of the housing;

another side surface that connects the first bottom surface of the stopper plate to the second bottom surface of the stopper plate, and wherein, with respect to the bottommost surface of the housing, the second bottom surface of the stopper plate is located higher than the first bottom surface of the stopper plate.

9. The object handling unit of claim 8, further comprising a force torque sensor configured to measure a force by the end-effector.

10. The object handling unit of claim 8, wherein the contact limit sensor is configured to detect the pressure associated with the engagement between the suction cup assembly and the object based on a displacement of the first suction cup relative to the housing.

11. The object handling unit of claim 10, wherein the second suction cup is displaceable relative to the housing independent of the first suction cup, wherein the contact limit sensor is further configured to detect the pressure associated with the engagement between the suction cup assembly and the object based on a displacement of the second suction cup relative to the housing, and wherein the first suction cup has a smaller size relative to a size of the second suction cup.

12. The object handling unit of claim 11, wherein the housing includes an offset step configured to permit a greater displacement of the second suction cup relative to the housing than a permitted displacement of the first suction cup, and
    wherein the contact limit sensor is configured to detect the pressure associated with the engagement between the suction cup assembly and the object based on the permitted displacement of the first suction cup and/or the second suction cup.

13. The object handling unit of claim 10, wherein the first suction cup is communicative coupled to the first suction shaft and the vacuum pressure generating source, and
    wherein the second suction shaft is movable toward the vacuum pressure generating source more than the first suction shaft.

14. The object handling unit of claim 13, wherein the suction cup assembly further includes:
    a displacement recovery mechanism configured to bias the first suction shaft into a default position relative to housing, and
    wherein the contact limit sensor is configured to detect the pressure associated with the engagement between the suction cup assembly and the object based on a pressure to overcome the bias provided by the displacement recovery mechanism.

15. A gripper attachment for an object handling system comprising:
    an end-effector configured for grasping an object, the end-effector including:
        a suction cup assembly including a housing and configured to engage the object;
        a contact limit sensor apparatus, including a contact limit sensor, configured to detect a pressure associated with the engagement between the suction cup assembly and the object based on registering an amount of displacement of the housing; and
        a stopper plate located above the contact limit sensor apparatus,
        wherein the suction cup assembly further includes:
            a first suction cup configured to couple to a vacuum pressure generating source via a first suction shaft movable through the housing, wherein the first suction cup is displaceable relative to the housing; and
            a second suction cup coupled to the vacuum pressure generating source via a second suction shaft movable through the housing, wherein the second suction cup is displaceable relative to the housing and independent of the first suction cup,
        wherein the contact limit sensor transmits contact information when the contact limit sensor detects the pressure exceeding a contact threshold,
        wherein the transmitted contact information causes movement of the end-effector toward the object to be limited,
        wherein, in a moving direction of the second suction shaft, an amount of a protrusion of the second suction shaft, from an uppermost surface of the housing toward the vacuum pressure generating source, is more than an amount of a protrusion of the first suction shaft from the uppermost surface of the housing toward the vacuum pressure generating source, and
        wherein the housing is configured to be displaced up to the stopper plate, in the moving direction of the second suction shaft, from an initial position to a contact limit position,
        wherein the housing includes an offset step including:
            a first upper surface of the housing through which the first suction shaft passes on opposing sides of the housing;
            a second upper surface of the housing through which the second suction shaft passes on opposing sides of the housing; and
            a side surface that connects the first upper surface of the housing to the second upper surface of the housing, and
        wherein, with respect to a bottommost surface of the housing, the second upper surface of the housing is located higher than the first upper surface of the housing;
        wherein the stopper plate includes another offset step including:
            a first bottom surface of the stopper plate located above the first upper surface of the housing;
            a second bottom surface of the stopper plate located above the second upper surface of the housing;
            another side surface that connects the first bottom surface of the stopper plate to the second bottom surface of the stopper plate, and
        wherein, with respect to the bottommost surface of the housing, the second bottom surface of the stopper plate is located higher than the first bottom surface of the stopper plate.

16. The gripper attachment of claim 15, wherein the first suction cup has a smaller size relative to a size of the second suction cup,
    wherein the housing includes an offset step configured to permit a greater displacement of the second suction cup relative to the housing than a permitted displacement of the first suction cup, and
    wherein the contact sensor is configured to detect a force associated with the engagement between the suction cup assembly and the object based on the permitted displacement of the first suction cup and the second suction cup.

17. The gripper attachment of claim 16, wherein the second suction shaft is movable toward the vacuum pressure generating source more than the first suction shaft, and
    wherein the suction cup assembly further includes:
        a displacement recovery mechanism configured to bias the first suction shaft into a default position relative to housing, and
        wherein the contact sensor is configured to detect the pressure associated with the engagement between the suction cup assembly and the object based on a pressure to overcome the bias provided by the displacement recovery mechanism.

* * * * *